US009442887B2

(12) United States Patent
Tate et al.

(10) Patent No.: US 9,442,887 B2
(45) Date of Patent: Sep. 13, 2016

(54) SYSTEMS AND METHODS FOR PROCESSING FRAGMENT ION SPECTRA TO DETERMINE MECHANISM OF FRAGMENTATION AND STRUCTURE OF MOLECULE

(75) Inventors: Stephen A. Tate, Barrie (CA); Ronald Bonner, Newmarket (CA)

(73) Assignee: DH Technologies Development Pte. Ltd., Singapore (SG)

(*) Notice: Subject to any disclaimer, the term of this patent is extended or adjusted under 35 U.S.C. 154(b) by 1110 days.

(21) Appl. No.: 13/471,385

(22) Filed: May 14, 2012

(65) Prior Publication Data

US 2013/0124102 A1 May 16, 2013

Related U.S. Application Data

(63) Continuation-in-part of application No. 12/474,418, filed on May 29, 2009, now Pat. No. 8,180,581, which is a continuation-in-part of application No. 12/200,636, filed on Aug. 28, 2008, now Pat. No. 8,073,639, which is a continuation-in-part of application No. 11/848,717, filed on Aug. 31, 2007, now Pat. No. 7,587,285.

(60) Provisional application No. 61/057,719, filed on May 30, 2008, provisional application No. 61/582,271, filed on Dec. 31, 2011.

(51) Int. Cl.
G06F 17/00 (2006.01)
H01J 49/00 (2006.01)
G06K 9/62 (2006.01)

(52) U.S. Cl.
CPC ............ *G06F 17/00* (2013.01); *G06K 9/6247* (2013.01); *H01J 49/005* (2013.01); *H01J 49/0036* (2013.01)

(58) Field of Classification Search
USPC ......... 702/22, 23, 27, 30; 250/282, 288, 291
See application file for complete search history.

(56) References Cited

U.S. PATENT DOCUMENTS

| 2009/0173880 A1* | 7/2009 | Bateman ............... H01J 49/065 250/292 |
| 2011/0278450 A1* | 11/2011 | Loucks, Jr. ........... H01J 49/005 250/290 |

* cited by examiner

*Primary Examiner* — Mohamed Charioui
(74) *Attorney, Agent, or Firm* — John R. Kasha; Kelly L. Kasha; Kasha Law LLC

(57) ABSTRACT

Correlated fragment ions of a molecule are grouped using mass spectrometry with ramps in collision energy (CE). A known molecule is fragmented and analyzed at a plurality of different collision energies using a mass spectrometer. A plurality of variables for a plurality of fragment ions are produced. Principal component analysis is performed on the plurality of variables. A number of principal components produced by the principal component analysis is selected. A subset principal component space is created having the number of principal components. A variable in the subset principal component space is selected. A spatial angle is defined around a vector extending from an origin to the variable. A set of one or more variables within the spatial angle of the vector is selected. The set is assigned to a group, if the set includes a minimum number of variables.

15 Claims, 20 Drawing Sheets

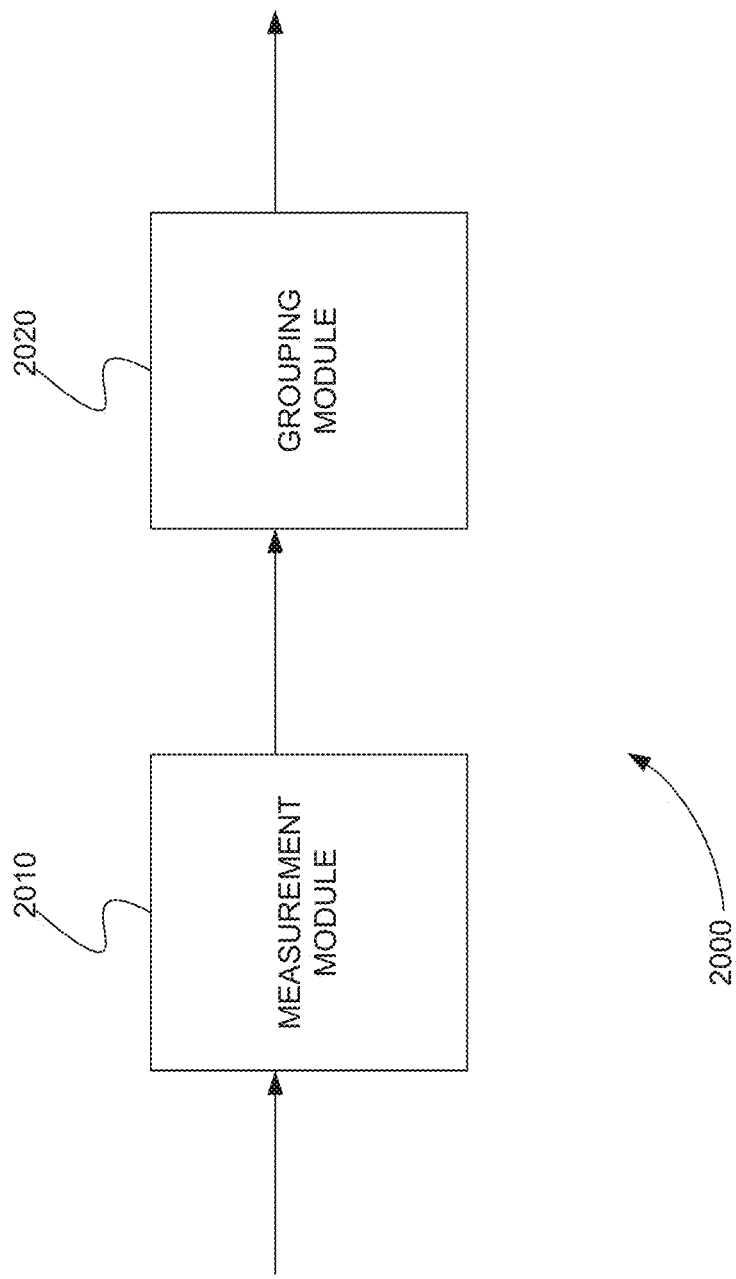

SYSTEMS AND METHODS FOR PROCESSING FRAGMENT ION SPECTRA TO DETERMINE MECHANISM OF FRAGMENTATION AND STRUCTURE OF MOLECULE

CROSS-REFERENCE TO RELATED APPLICATIONS

This application is a continuation-in-part application of U.S. application Ser. No. 12/474,418 filed on May 29, 2009 now U.S. Pat. No. 8,180,581, which is a continuation-in-part application of U.S. application Ser. No. 12/200,636, filed on Aug. 28, 2008, now U.S. Pat. No. 8,073,639, which is a continuation-in-part application of U.S. application Ser. No. 11/848,717, filed on Aug. 31, 2007, now U.S. Pat. No. 7,587,285 and which claims the benefit of U.S. Provisional Application Ser. No. 61/057,719, filed on May 30, 2008; this application also claims the benefit of U.S. Provisional Application Ser. No. 61/582,271, filed on Dec. 31, 2011. All of the above mentioned applications are incorporated by reference herein in their entireties.

INTRODUCTION

The elucidation of a chemical structure is very difficult using mass spectrometry/mass spectrometry (MS/MS). The mechanism by which a fragment ion is generated requires a high degree of skill and input from prior chemical and mechanistic chemistry knowledge. However, the aim of such experiments is to provide an insight into the structure of a molecule.

Historically this has been performed by undertaking lengthy experiments. These experiments use ramps in collision energy (CE). The decomposition profiles of the different ions are then plotted to determine the potential order by which the fragment occurs. The potential order by which the fragment occurs helps in fitting together the different components.

Such a method is fine for the components that comprise the majority of the spectra i.e. primary fragments. But in any fragment ion spectra, the number of fragment ions generated is large. It is these ions which can support a defined mechanism or propose novel mechanisms of fragmentation and hence assist in the determination of the molecular structure. It is normal to threshold spectra prior to analysis removing these fragment ions as the total number of ions can be very large if all are taken into account. This results in potentially important information being lost.

BRIEF DESCRIPTION OF THE APPENDICES AND DRAWINGS

Appendix 1 is an exemplary description a method for identifying the structure of molecule using spectrometry/mass spectrometry (MS/MS) with ramps in collision energy (CE), in accordance with various embodiments.

FIG. 1 is a block diagram that illustrates a computer system, upon which embodiments of the present teachings may be implemented.

FIG. 20 is a schematic diagram of a system that includes one or more distinct software modules that performs a method for grouping fragment ions of a molecule using mass spectrometry with ramps in collision energy, in accordance with various embodiments.

Figure 1:
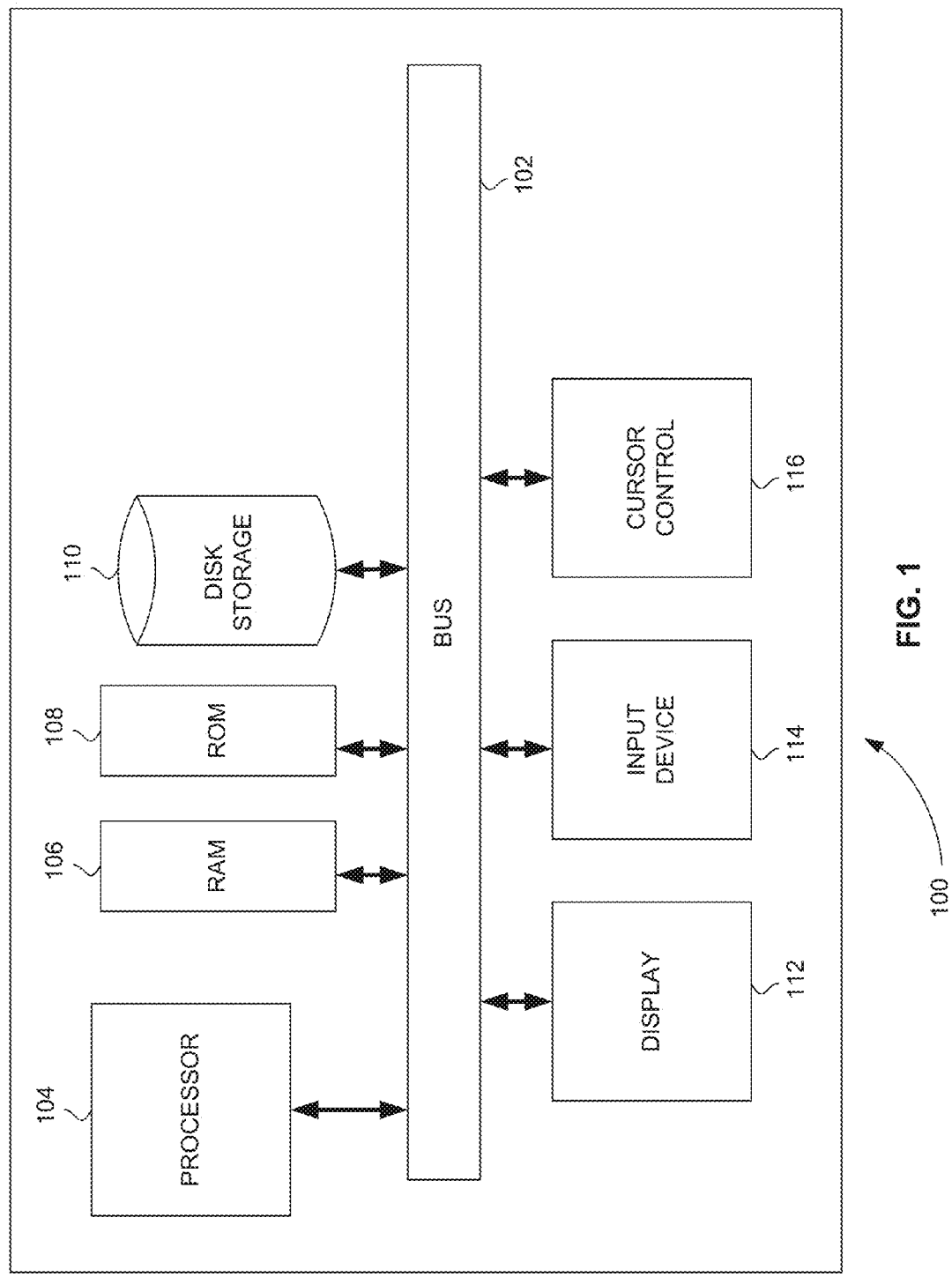
FIG. 1 is a block diagram that illustrates a computer system, in accordance with various embodiments.

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the phraseology and terminology used herein is for the purpose of description and should not be regarded as limiting.

DESCRIPTION OF VARIOUS EMBODIMENTS

Computer-Implemented System

FIG. 1 is a block diagram that illustrates a computer system 100, upon which embodiments of the present teachings may be implemented. Computer system 100 includes a bus 102 or other communication mechanism for communicating information, and a processor 104 coupled with bus 102 for processing information. Computer system 100 also includes a memory 106, which can be a random access memory (RAM) or other dynamic storage device, coupled to bus 102 for storing instructions to be executed by processor 104. Memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or liquid crystal display (LCD), for displaying information to a computer user. An input device 114, including alphanumeric and other keys, is coupled to bus 102 for communicating information and command selections to processor 104. Another type of user input device is cursor control 116, such as a mouse, a trackball or cursor direction keys for communicating direction information and command selections to processor 104 and for controlling cursor movement on display 112. This input device typically has two degrees of freedom in two axes, a first axis (i.e., x) and a second axis (i.e., y), that allows the device to specify positions in a plane.

A computer system 100 can perform the present teachings. Consistent with certain implementations of the present teachings, results are provided by computer system 100 in response to processor 104 executing one or more sequences of one or more instructions contained in memory 106. Such instructions may be read into memory 106 from another computer-readable medium, such as storage device 110. Execution of the sequences of instructions contained in memory 106 causes processor 104 to perform the process described herein. Alternatively hard-wired circuitry may be used in place of or in combination with software instructions to implement the present teachings. Thus implementations of the present teachings are not limited to any specific combination of hardware circuitry and software.

The term "computer-readable medium" as used herein refers to any media that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as memory 106. Transmission media includes coaxial cables, copper wire, and fiber optics, including the wires that comprise bus 102.

Common forms of computer-readable media include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 104 for execution. For example, the instructions may initially be carried on the magnetic disk of a remote computer. The remote computer can load the instructions into its dynamic memory and send the instructions over a network. The remote computer can receive data over the network and place the data on bus 102. Bus 102 carries the data to memory 106, from which processor 104 retrieves and executes the instructions. The instructions received by memory 106 may optionally be stored on storage device 110 either before or after execution by processor 104.

In accordance with various embodiments, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software but the present teachings may be implemented as a combination of hardware and software or in hardware alone. The present teachings may be implemented with both object-oriented and non-object-oriented programming systems.

PCA

Principal component analysis (PCA) is a multivariate analysis (MVA) tool that is widely used to help visualize and classify data. PCA is a statistical technique that may be used to reduce the dimensionality of a multi-dimensional dataset while retaining the characteristics of the dataset that contribute most to its variance. For this reason PCA is often used to pre-process data for techniques that do not handle high dimensionality data well such as linear discriminant analysis (LDA).

PCA can reduce the dimensionality of a large number of interrelated variables by using an eigenvector transformation of an original set of variables into a substantially smaller set of principal component (PC) variables that represents most of the information in the original set. The new set of variables is ordered such that the first few retain most of the variation present in all of the original variables. More particularly, each PC is a linear combination of all the original measurement variables. The first is a vector in the direction of the greatest variance of the observed variables. The succeeding PCs are chosen to represent the greatest variation of the measurement data and to be orthogonal to the previously calculated PC. Therefore, the PCs are arranged in descending order of importance. The number of PCs (n) extracted by PCA cannot exceed the smaller of the number of samples or variables. However, many of the variables may correspond to noise in the data set and contain no useful information.

PCA requires that data be presented in the form of a matrix (hereafter referred to as "the Input Matrix") where, for example, rows represent samples, columns represent variables, and an element or cell of the Input Matrix indicates the amount of that variable in a particular sample. Alternatively, the Input Matrix can include rows that represent variables, columns that represent samples, and elements that represent the amount of that variable in a particular sample. In the latter case, the processing described as applied to a loadings plot is instead applied to a scores plot. An Input Matrix can be decomposed into a series of score and loading vectors. The loading vectors indicate the contribution that each variable makes to a particular PC. The score vectors are a measure of the amount of each component in a particular sample.

Scores and loadings plots can be displayed where the axes represent two or more PCs, the samples are positioned according to their scores, and the variables are positioned according to the loadings. The scores reflect the amount of each PC present in the sample while the loadings indicate the importance of each variable to the PC.

Although PCA is an unsupervised technique requiring no knowledge of any sample groups, this information is frequently available and helps to interpret the scores plot. Knowledge about sample groups can, for example, help determine if the samples separate in an expected way or not. In contrast to the scores plot, the loadings plot can be very difficult to interpret, especially when there are many variables and none are dominant, or the data has been autoscaled to remove the effect of intensity.

Although it is common to remove correlated variables prior to PCA, their identification can help further interpretation. For example, in mass spectral data, correlated peaks may be unpredictable fragments or may have known origins including, but not limited to, isotopes, adducts, and different charge states. Recognizing unpredictable fragments can help identify the compound that generated the spectrum. Consequently, it can be beneficial to retain all variables extracted from the raw data, rather than removing the correlated variables before performing PCA, since this allows the loadings plots to be interpreted to find correlated features. Essentially, PCA is using the variables to separate and group the samples, but it is also using the samples to separate and cluster the variables. Once the correlated variables have been identified, they can be simplified in a number of ways including, for example, replacing a set of correlated variables with some group representation including, but not limited to, the most intense variable of the correlated variables, a new variable with the mean intensity of the correlated variables, or the sum of the correlated variables.

Methods of Data Processing

Principal Component Variable Grouping

In various embodiments, groups of correlated variables are identified using principal component analysis (PCA) followed by variable grouping. PCA followed by variable grouping can be called principal component variable grouping (PCVG).

Figure 2:
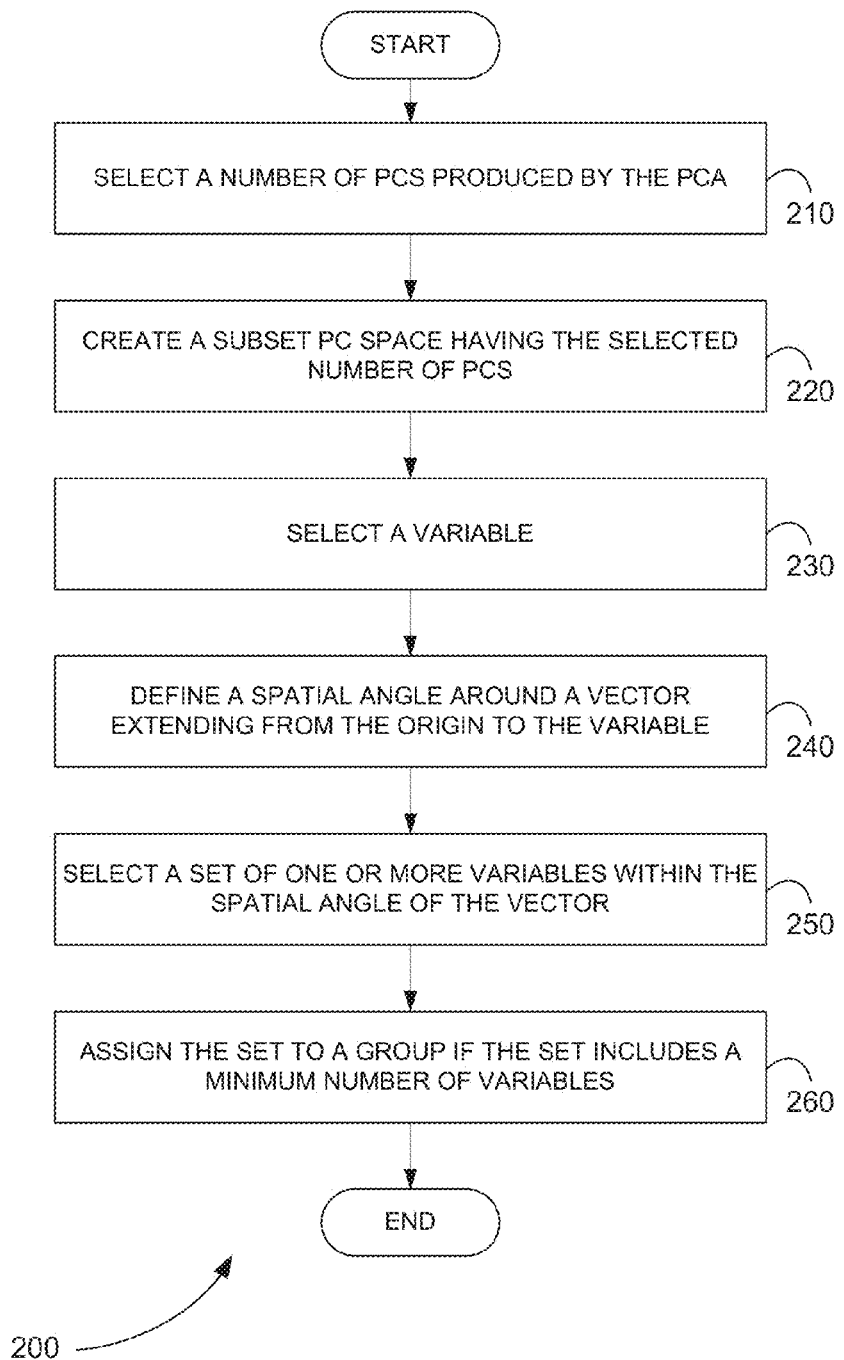
FIG. 2 is an exemplary flowchart showing a method for identifying a group of correlated variables after principal component analysis of a plurality of variables from a plurality of samples using principal component variable grouping (PCVG) that is consistent with the present teachings.

FIG. 2 is an exemplary flowchart showing a method 200 for identifying a group of correlated variables after PCA of a plurality of variables from a plurality of samples using PCVG that is consistent with the present teachings.

In step 210 of method 200, a number of PCs produced by the PCA is selected. The number of PCs selected is, for example, less than the total number of PCs produced by the PCA. In various embodiments, the number of PCs selected is the smallest number that represents a specified percentage of the total variance.

In step 220, a subset PC space having the number of PCs selected is created.

In step 230, a variable is selected in the subset PC space. The variable selected is, for example, the variable that is furthest from the origin.

In step 240, a spatial angle is defined around a vector extending from the origin of the subset PC space to the selected variable.

In step 250, a set of one or more variables in the subset PC space is selected within the spatial angle of the vector. In various embodiments, if one or more variables within the set have a significance value less than a threshold value, then the one or more variables are not selected for the first set. The significance value is a minimum distance parameter, for example. The minimum distance parameter is a minimum distance from the origin, for example.

In step 260, the set is assigned to a group, if the set includes a minimum number of variables. The group identifies correlated variables, for example. The minimum number of variables is the number of correlated variables a group is expected to include, for example. The minimum number of variables can be, for example, one or a number greater than one.

In various embodiments, method 200 can also include calculating a second vector from the group, selecting a second set of one or more variables within the spatial angle of the second vector, and replacing the variables of the group with the variables of the second set, if the second set includes a minimum number of variables. The spatial angle of the second vector can be the same spatial angle defined in step 240, or the spatial angle of the second vector can be a spatial and that is different from the spatial angle defined in step 240. The second vector can be any linear or nonlinear combination of the variables in the group. For example, the second vector can be, but is not limited to, the arithmetic mean, a weighted mean, the median, or the geometric mean. In various embodiments, if one or more variables within the second set have a significance value less than a threshold value, then the one or more variables are not selected for the second set. The significance value is a minimum distance parameter, for example. The minimum distance parameter is a minimum distance from the origin, for example.

In various embodiments, method 200 can also include assigning a different symbol to each group that is identified. These symbols can then be used to visualize and interpret the loadings data.

In various embodiments, method 200 can also include assigning a set of variables that are anti-correlated to a group. This includes extending a line including the vector on an opposite side of the origin of the subset PC space, selecting a second set of one or more variables within the spatial angle of the line on the opposite side of the origin, and adding the second set to the group, if the set and the second set includes the minimum number of variables. In various embodiments, if one or more variables within the second set have a significance value less than a threshold value, then the one or more variables are not selected for the second set. The significance value is a minimum distance parameter, for example. The minimum distance parameter is a minimum distance from the origin, for example.

In various embodiments, method 200 can also include removing the set from further analysis, selecting a second variable in the PC space, selecting a second set of one or more variables within the spatial angle of a second vector extending from the origin of the subset PC space to the second variable, and assigning the second set to a second group of variables, if the second set includes the minimum number of variables. The second group identifies correlated variables also. The minimum number of variables can be, for example, one or a number greater than one. The second variable can, for example, be the unassigned variable that is furthest from the origin of the subset PC space.

In various embodiments, method 200 can also include calculating a third vector from the second group, selecting a third set of one or more variables within the spatial angle of the third vector; and replacing the variables of the second group with the variables of the third set, if the third set includes a minimum number of variables. The variables of the second group are assigned from the second set, for example. The third vector can be any linear or nonlinear combination of the variables in the second group. For example, the third vector can be, but is not limited to, the arithmetic mean, a weighted mean, the median, or the geometric mean. In various embodiments, one or more variables within the third set that have a significance value less than a threshold value are not selected. The significance value is a minimum distance parameter, for example. The minimum distance parameter is a minimum distance from the origin, for example. For visualization and interpretation purposes, a second and different symbol can be assigned to the second group.

In various embodiments, method 200 can also include assigning a set of variables that are anti-correlated to the second group. This includes extending a line comprising the second vector on an opposite side of the origin, selecting a third set of one or more variables within the spatial angle of the line on the opposite side of the origin, and adding the third set to the second group, if the set and the third set include the minimum number of variables. The minimum number of variables can be, for example, one or a number greater than one. In various embodiments, if one or more variables within the third set that have a distance from the origin less than a threshold value, then the one or more variables are not selected. The threshold value is a minimum distance parameter, for example.

In various embodiments, method 200 can also include sorting assigned groups. The sorting can be done, for example, by the largest distance from the origin in each group.

In various embodiments, method 200 can also include removing variables assigned to the group in step 260 from further analysis and repeating the steps of removing variables of a last assigned group from further analysis, selecting a new variable in the subset PC space, selecting a new set of one or more variables within the spatial angle of a new vector extending from the origin to the new variable, assigning the new set to a new group, if the new set includes the minimum number of variables, and removing variables of the new group from further analysis until the variables not assigned to a group do not exceed a threshold. The threshold can be, for example, a distance from the origin. Repeating these steps produces a plurality of groups of correlated variables, for example.

As mentioned above, PCA can be applied to data with a large number of variables and comparatively few samples (this data is said to have high dimensionality). Other analysis techniques require data where the number of samples exceeds the number of variables. Examples of these other analysis techniques include, but are not limited to, linear discriminant analysis (LDA) and independent component analysis (ICA). PCA, therefore, can be used to reduce the dimensionality of data for use in other analysis techniques, such as LDA and ICA. The reduced dimensions can be PCs or group representations of the groups. Using group representations is preferable, because groups are interpretable combinations of the original variables.

In various embodiments, method 200 can also include assigning a group representation to the group and using the group representation and the plurality of samples as input to a subsequent analysis technique. The group representation can include, but is not limited to, the most intense variable of the group, a variable with the mean intensity of the group, or the sum of the variables of the group. The subsequent analysis technique can include, but is not limited to, a clustering technique or a pattern recognition technique. The subsequent analysis technique can include, but is not limited to, LDA or ICA.

In various embodiments, method 200 can also include processing the group representation to generate new variables for input to the subsequent analysis technique. The subsequent analysis technique can include, but is not limited to, LDA, ICA, or PCA. Processing the group representation can include, but is not limited to, generating a nonlinear combination of the group representation and at least one other group representation. For example, a new variable can be a ratio of the group representation and another group representation.

In various embodiments of the present teachings, data scaling is performed prior to PCA processing so that, for example, high intensity variables do not dominate the analysis. One scaling technique is autoscaling, where the value for each variable is processed by first subtracting the mean of all values of the variable (i.e., mean centering) and then dividing by the variance of the variable. Autoscaling weights all variables equally and is appropriate where the variables are unrelated and can have widely different scales. However, when the variables are all of the same type (i.e., mass spectral or chromatographic peaks) and the more intense variables are more significant and less likely to be noise, Pareto scaling can be more advantageous. In Pareto scaling the mean centered values are divided by the square root of the variance. Pareto scaling reduces, but does not eliminate, the original intensity contribution and helps in interpreting loadings plots.

Figure 3:
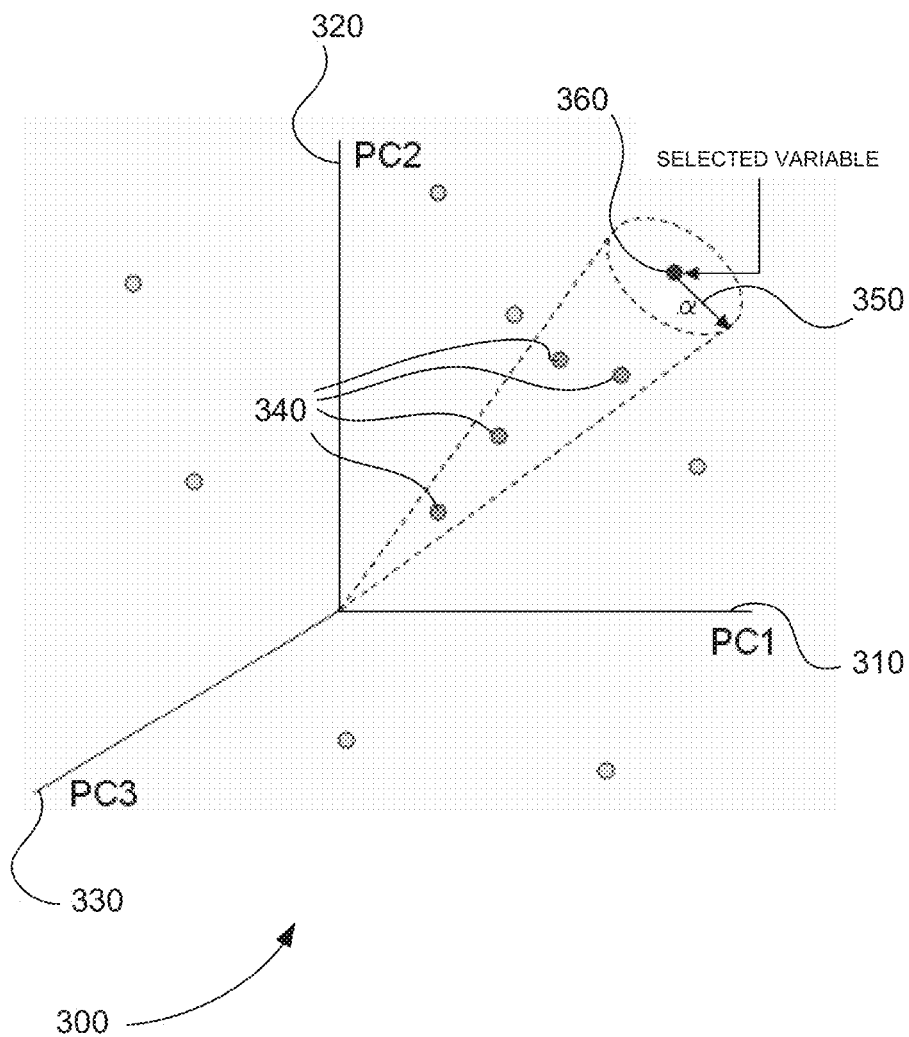
FIG. 3 is an exemplary illustration that shows how a set of one or more variables can be found within a spatial angle of a selected variable, in accordance with the present teachings.

FIG. 3 is an exemplary illustration 300 that shows how a set of one or more variables 340 can be found within a spatial angle 350 of a selected variable 360, in accordance with the present teachings. The three-dimensional PC space shown in FIG. 3 includes PCs PC1 310, PC2 320, and PC3 330. Variable 360 is selected in this three-dimensional PC space. Spatial angle 350 is defined around a vector extending from the origin to selected variable 360. One or more variables found within spatial angle 350 are selected as the set of one or more variables 340.

Figure 4:
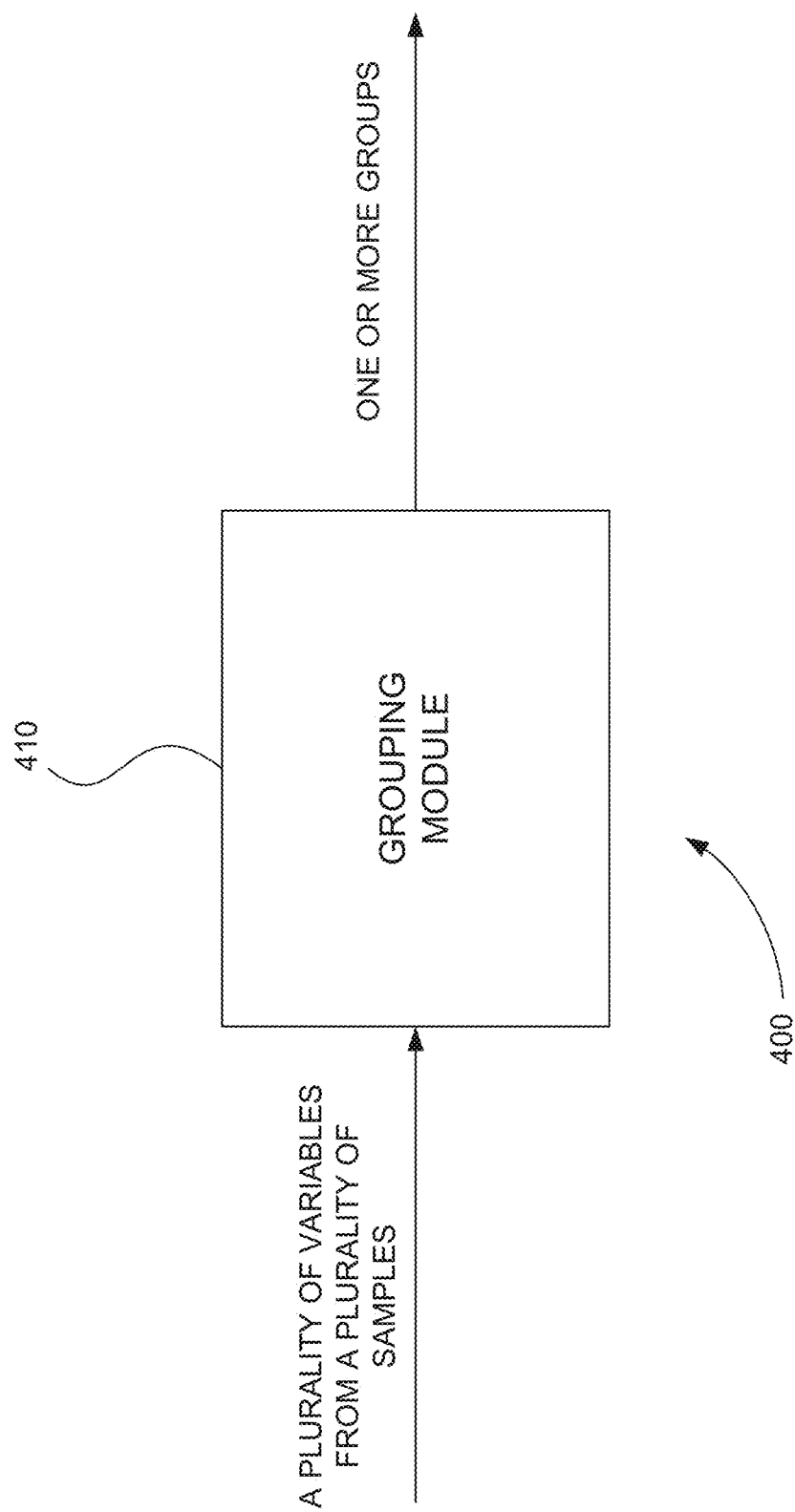
FIG. 4 is an exemplary schematic diagram showing a computing system for grouping variables after PCA of a plurality of variables from a plurality of samples produced by a measurement technique that is consistent with the present teachings.

FIG. 4 is an exemplary schematic diagram showing a computing system 400 for grouping variables after PCA of a plurality of variables from a plurality of samples produced by a measurement technique that is consistent with the present teachings. Computing system 400 includes grouping module 410. Grouping module 410 selects the number of PCs produced by the PCA, creates a subset PC space having the number of PCs, selects a variable, defines a spatial angle around a vector extending from an origin to the variable, selects a set of one or more variables within the spatial angle of the vector, and assigns the set to a group, if the set includes a minimum number of variables.

Figure 15:
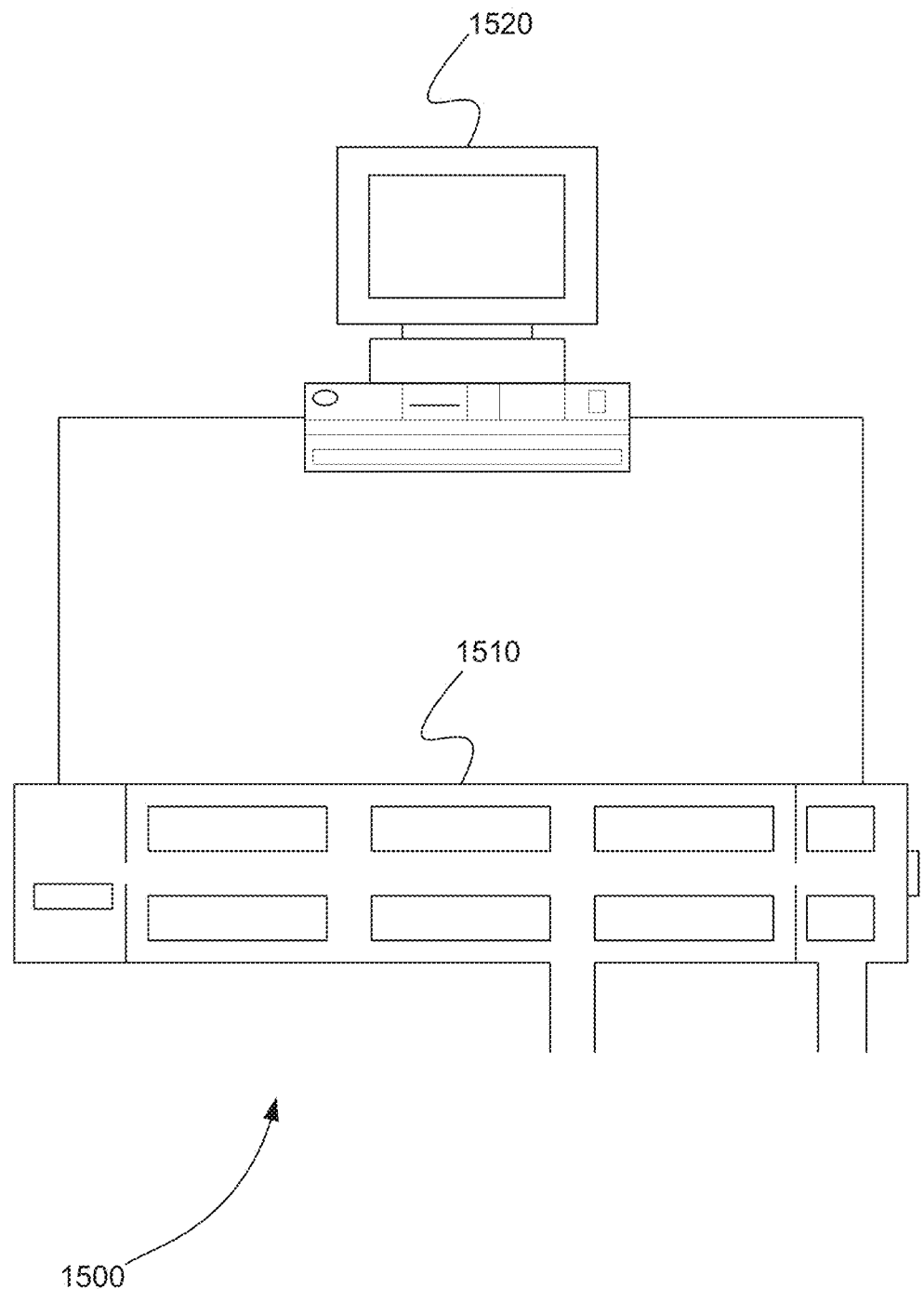
FIG. 15 is a schematic diagram showing a system for identifying groups of correlated representations of variables from a large amount of spectrometry data, in accordance with the present teachings.

In various embodiments of computing system 400, the plurality of variables can be generated using a measurement technique that generates more than one variable per constituent of a sample. The plurality of variables is generated using a measurement device, for example, as shown in FIG. 15. A measurement device can be, but is not limited to, a spectrometer or a mass spectrometer. Measurement techniques can include, but are not limited to, nuclear magnetic resonance, infra-red spectrometry, near infra-red spectrometry, ultra-violet spectrometry, Raman spectrometry, or mass spectrometry. In various embodiments the plurality of variables can be generated using a measurement technique that generates more than one variable per constituent of a sample combined with a separation technique. Separation techniques can include, but are not limited to, liquid chromatography, gas chromatography, or capillary electrophoresis.

In various embodiments, grouping module 410 can also select a second variable in the PC space, select a second set of one or more variables within the spatial angle of a second vector extending from the origin to the second variable, and assign the second set to a second group of variables, if the second set comprises the minimum number of variables.

Another PCVG method consistent with the present teachings is outlined below:

1. Perform PCA on all variables using Pareto scaling.
2. Determine the number of PCs (m) to be used. Using all n of the PCs extracted will exactly reproduce the original data. However, many of these PCs represent noise fluctuations in the data and can be ignored with no loss of information. Selecting m PCs effectively smoothes the data. Each variable is represented by a vector in this m-dimensional space.
3. Determine the target vector (t) that corresponds to the variable furthest from the origin. For this to be effective autoscaling is not used. Autoscaling is undesirable because it weights all variables, including small noise peaks, equally.
4. Define a spatial angle ($\alpha$) around this vector and find other data points (vectors) that are within that angle, optionally ignoring low intensity variables. If a second vector is x, then the angle ($\theta$) between x and the target vector can be found from:

$$x \cdot t = |x||t|\cos(\theta)$$

5. Calculate the mean of all selected vectors and repeat step 3 using the new mean vector and assign all selected variables to a group. "Re-centering" in this way fine tunes the orientation of the spatial angle and can be effective if the most intense variable is atypical in some way. For example, the profile may be distorted if the peak is saturated in the most concentrated samples. Since Pareto scaling has been used, calculating the mean vector also causes the lower intensity ions to have less effect on the result.
6. Repeat the process from step 3 ignoring previously grouped variables until there are no remaining variables with sufficient intensity.

Figure 5:
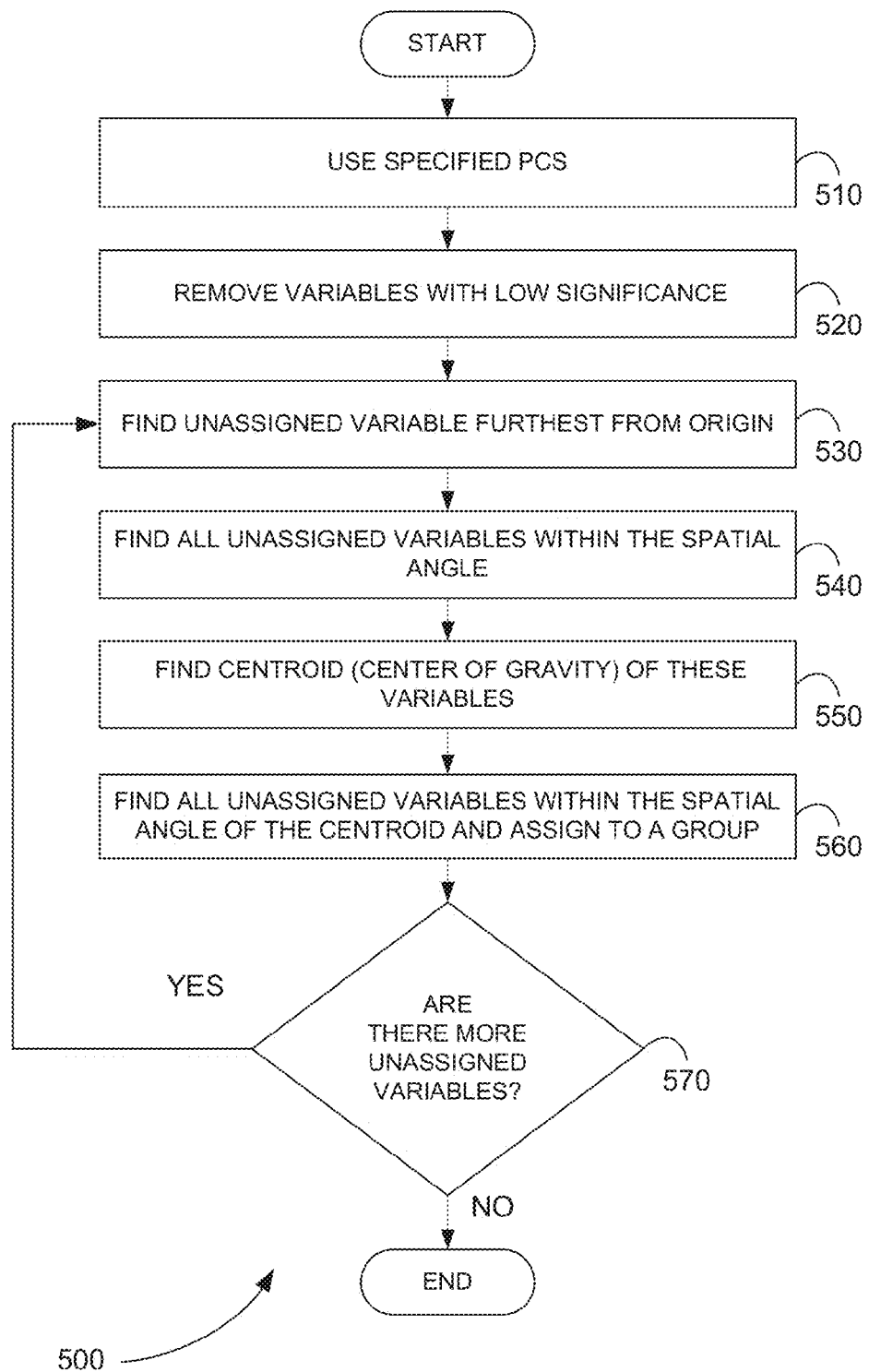
FIG. 5 is an exemplary flowchart showing a computer-implemented method that can be used for processing data in n-dimensional space and that is consistent with the present teachings.

FIG. 5 is an exemplary flowchart showing a computer-implemented method 500 that can be used for processing data in n-dimensional space and that is consistent with the present teachings.

In step 510 of method 500, PCA is performed on all variables and the specified subset of PCs is used.

In step 520, variables with low significance are removed. Filtering out variables that have low significance with respect to the selected scaling and PCA significance measure is optional. The same effect can be achieved by adding a step after grouping the variables and by using a different significance criterion. Another significance criterion that can be used is optical contrast, for example.

In step 530, a vector of an unassigned variable furthest from the origin is found.

In step 540, all vectors within a spatial angle of the vector are found.

In step 550, a mean of vectors within a spatial angle of the vector is found.

In step 560, all unassigned variables within the spatial angle of the mean are found and assigned to a group. Variables assigned to the group are then removed from processing.

In step 570, if any variables are left for processing, method 500 returns to step 530. If no variables are left for processing, method 500 ends.

The result of this processing is a number of groups of correlated variables that can be interpreted further, or group representations that can be used as input to subsequent analysis techniques. For visualization purposes, it is useful to identify grouped variables in a loadings plot by assigning a symbol to the group. Interpretation can be aided by generating intensity or profile plots for all members of a group.

Iterative Principal Component Variable Grouping

As described above, mass spectrometry's ability to generate large amounts of data poses a significant problem for many data processing techniques. In particular, the high dimensionality (large number of variables) of mass spectrometry (MS) data with a large number of samples, liquid chromatography coupled mass spectrometry (LC-MS) data, and imaging MS data can be a problem for these techniques.

The large number of variables produced by MS can also be a problem for principal component analysis (PCA) followed by variable grouping, or principal component variable grouping (PCVG). PCVG can be affected by a large number of variables in at least two different ways. First, a large number of variables can overwhelm the processor or computer used to perform the PCVG algorithm. As result, data analysis cannot be performed in a reasonable period of time. Second, a large number of variables can reduce the specificity of the PCVG algorithm decreasing the quality of results. For example, when processing large amounts of data, smaller pieces of the data can be obscured by the overall noise of the large data set.

In various embodiments, PCVG is applied iteratively to segments of the data in order to handle a large amount of data. In this technique, the data is judiciously divided into segments. The segments are chosen so that they are small enough not to reach the limitations of the computer or processor used to execute the PCVG algorithm and not to cause a reduction in the specificity of the PCVG results. The segments are also chosen so that they are large enough so that PCVG can produce a number of correlated groups without having to perform too many iterations.

In order to reduce the overall amount of data, each group of correlated variables produced by performing PCVG on a segment is replaced with a group representation. Consequently, the result of performing PCVG on all segments is data set of all of the group representations produced by all of the segments. If the total number of all of the group representations is still too large for a single PCVG run, the data set of all of the group representations is divided again into segments and PCVG is performed on each segment. This division of group representations followed by iterations of PCVG continues until the total number of all of the group representations is small enough to allow a single run of PCVG that will perform within the constraints of the processor used and will provide the required specificity.

Once the total number of all of the group representations is small enough to allow a single run of PCVG, PCVG is performed on the data set of all of the group representations and groups of correlated variables are identified. These groups represent the correlated variables for the original large amount of measured MS data.

FIG. 15 is a schematic diagram showing a system 1500 for identifying groups of correlated representations of variables from a large amount of spectrometry data, in accordance with the present teachings. System 1500 includes spectrometer 1510 and processor 1520. Spectrometer 1510 is a mass spectrometer, for example. Processor 1520 can be, but is not limited to, a computer, microprocessor, or any device capable of sending and receiving control signals and data from spectrometer 1510 and processing data. Spectrometer 1510 analyzes a plurality of samples and produces a plurality of variables from the plurality of samples.

Processor 1520 is in communication with spectrometer 1510. Processor 1520 performs a number of steps.

(1) Processor 1520 obtains the plurality of measured variables from spectrometer 1510 and divides the plurality of measured variables into a plurality of measured variable subsets.

(2) Processor 1520 performs PCVG on each measured variable subset, producing one or more group representations for each measured variable subset and a plurality of group representations for the plurality of measured variable subsets.

(3) Processor 1520 calculates a total number of the plurality of group representations as the sum of the number of the one or more group representations produced for each measured variable subset.

(4) If the total number is less than or equal to a maximum number of variables allowed for principal component analysis followed by variable grouping, processor 1520 jumps to step (10). The maximum number is based on the processing power of processor 1520, for example. In various embodiments, the maximum number is based on the number of points needed so that correlated points are not broken into different subsets.

(5) Processor 1520 divides the plurality of group representations into a plurality of group representation subsets.

(6) Processor 1520 performs PCVG on each group representation subset, producing one or more group representations for each group representation subset and a plurality of group representations for the plurality of group representation subsets.

(7) Processor 1520 calculates the total number of the plurality of group representations as a sum of the number of the one or more group representations produced for each group representation subset.

(8) If the total number is less than or equal to a maximum number, processor 1520 jumps to step (10).

(9) If the total number is greater than the maximum number of variables, the processor repeats steps (5)-(9), and

(10) Processor 1520 performs PCVG on the plurality of group representations, producing a plurality of groups of correlated representations of variables.

In various embodiments, processer 1520 performs PCVG on each measured variable subset in step (2) according to the following steps.

(i) Processor 1520 performs principal component analysis on each measured variable.

(ii) Processor 1520 selects a number of principal components produced by the principal component analysis, (iii) Processor 1520 creates a subset principal component space having the number of principal components.

(iv) Processor 1520 selects a variable of the each measured variable subset in the subset principal component space that has a significance value greater than a threshold value. The threshold value is a minimum distance from the origin of the subset principal component space, for example.

(v) Processor 1520 defines a spatial angle around a vector extending from the origin to the variable.

(vi) Processor 1520 selects a group of one or more variables within the spatial angle of the vector.

(vii) Processor 1520 assigns a group representation to the group, if the group comprises a minimum number of variables. The minimum number of variables is a minimum number of correlated variables a group is expected to include, for example.

(viii) Processor 1520 repeats steps (iv)-(viii) until no variables remain in the subset principal component space that have not been selected, that have not been made part of a group to which a group representation has been assigned, or that have a significance value that exceeds the threshold value.

In various embodiments, the spatial angle defined in step (v) by processor 1520 is a constant angle for applications. This constant angle is approximately 15 degrees, for example. In various embodiments, the number of principal components selected in step (ii) by processor 1520 is adjusted for different applications. The number of principal components is selected so that the number of variable groups is smaller than the expected maximum number of independent components, for example.

Similarly and in various embodiments, processer 1520 performs PCVG on each group representation subset in step (6), as described above, according to the following steps.

(i) Processor 1520 performs principal component analysis on each group representation subset.

(ii) Processor 1520 selects a number of principal components produced by the principal component analysis.

(iii) Processor 1520 creates a subset principal component space having the number of principal components.

(iv) Processor 1520 selects a representation of each group representation subset in the subset principal component space that has a significance value greater than a threshold value. The threshold value is a minimum distance from the origin of the subset principal component space, for example.

(v) Processor 1520 defines a spatial angle around a vector extending from an origin of the subset principal component space to the representation.

(vi) Processor 1520 selects a group of one or more representations within the spatial angle of the vector.

(vii) Processor 1520 assigns a group representation to the group, if the group comprises a minimum number of representations. The minimum number of representations is a minimum number of correlated representations a group is expected to include, for example.

(viii) Processor 1520 repeats steps (iv)-(viii) until no representations remain in the subset principal component space that have not been selected, that have not been made part of a group identified as a group of correlated representations, or that have a significance value that exceeds the threshold value.

Finally and in various embodiments, processer 1520 performs PCVG on the plurality of group representations in step (10), as described above, according to the following steps.

(i) Processor 1520 performs principal component analysis on the plurality of group representations.

(ii) Processor 1520 selects a number of principal components produced by the principal component analysis.

(iii) Processor 1520 creates a subset principal component space having the number of principal components.

(iv) Processor 1520 selects a representation of the plurality of group representations in the subset principal component space that has a significance value greater than a threshold value. The threshold value is a minimum distance from the origin of the subset principal component space, for example.

(v) Processor 1520 defines a spatial angle around a vector extending from an origin of the subset principal component space to the representation.

(vi) Processor 1520 selects a group of one or more variables within the spatial angle of the vector.

(vii) Processor 1520 identifying the group as a group of correlated representations of variables, if the group comprises a minimum number of representations. The minimum number of representations is a minimum number of correlated representations of variables a group is expected to include, for example.

(viii) Processor 1520 repeats steps (iv)-(viii) until no representations remain in the subset principal component space that have not been selected, that have not been made part of a group identified as a group of correlated representations of variables, or that have a significance value that exceeds the threshold value.

Figure 16:
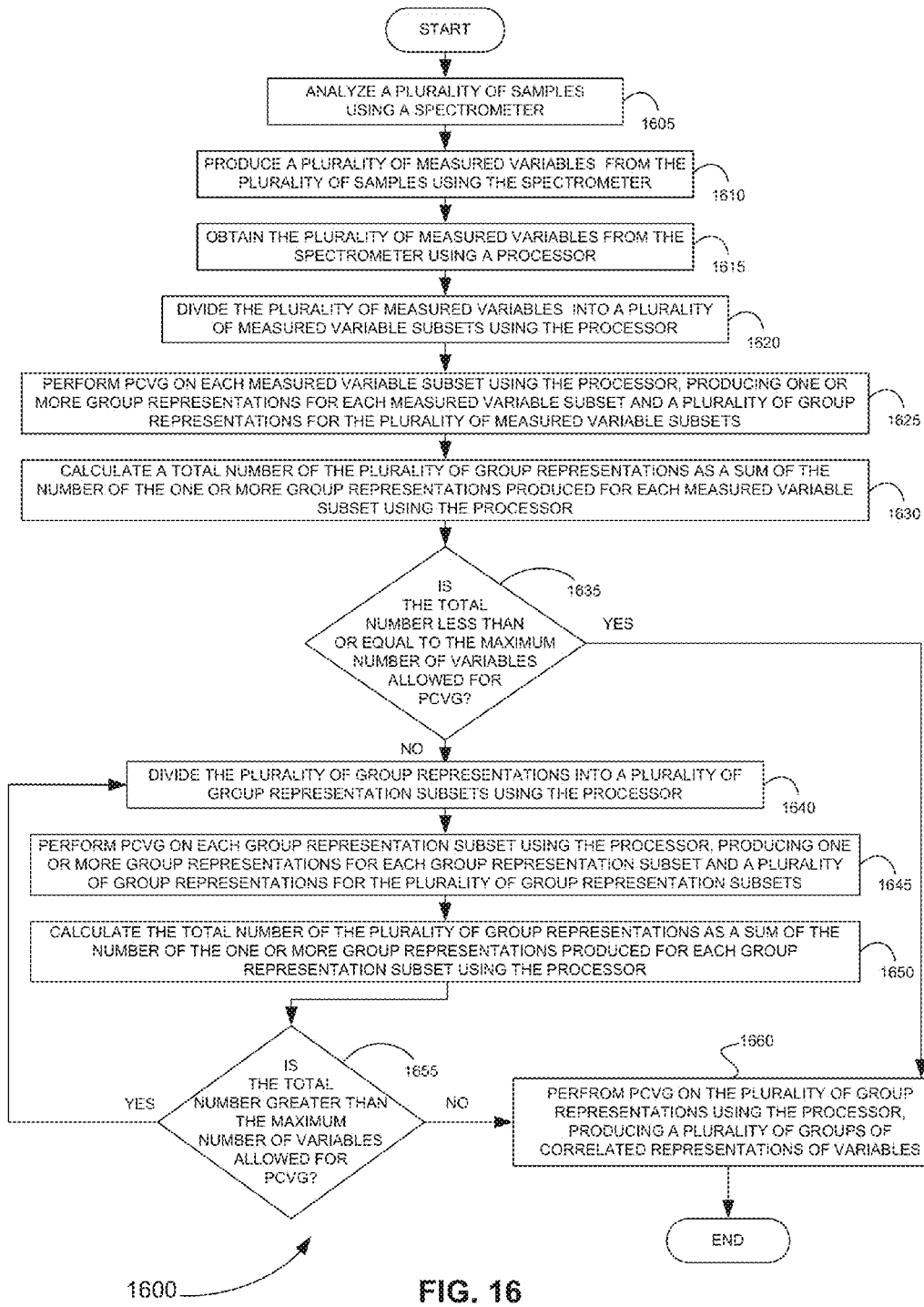
FIG. 16 is a flowchart showing a method for identifying groups of correlated representations of variables from a large amount of spectrometry data, in accordance with the present teachings.

FIG. 16 is a flowchart showing a method 1600 for identifying groups of correlated representations of variables from a large amount of spectrometry data, in accordance with the present teachings.

In step 1605 of method 1600, a plurality of samples is analyzed using a spectrometer. The plurality of samples is analyzed using measurements techniques including, but not limited to, mass spectrometry (MS), liquid chromatography coupled mass spectrometry (LC-MS), or imaging mass spectrometry In step 1610, a plurality of measured variables is produced from the plurality of samples using the spectrometer.

In step 1615, the plurality of measured variables is obtained from the spectrometer using a processor.

In step 1620, the plurality of measured variables is divided into a plurality of measured variable subsets using the processor.

In step 1625, PCVG is performed on each measured variable subset using the processor, producing one or more group representations for each measured variable subset and a plurality of group representations for the plurality of measured variable subsets.

In step 1630, a total number of the plurality of group representations is calculated as a sum of the number of the one or more group representations produced for each measured variable subset using the processor.

In step 1635, it is determined if the total number is less than or equal to the maximum number of variables allowed for PCVG using the processor. If the total number is less than or equal to the maximum number, method 1600 jumps to step 1680 using the processor.

In step 1640, the plurality of group representations is divided into a plurality of group representation subsets using the processor.

In step 1645, PCVG is performed on each group representation subset using the processor, producing one or more group representations for each group representation subset and a plurality of group representations for the plurality of group representation subsets.

In step 1650, the total number of the plurality of group representations is calculated as a sum of the number of the one or more group representations produced for each group representation subset using the processor.

In step 1655, it is determined if the total number is greater than the maximum number of variables using the processor. If the total number is greater than the maximum number, method 1600 jumps to step 1640.

In step 1660, PCVG is performed on the plurality of group representations using the processor, producing a plurality of groups of correlated representations of variables.

In various embodiments, a computer program product includes a tangible computer-readable storage medium whose contents include a program with instructions being executed on a processor so as to perform a method for identifying groups of correlated variables from a large amount of data. This method is performed by a system of distinct software modules.

Figure 17:
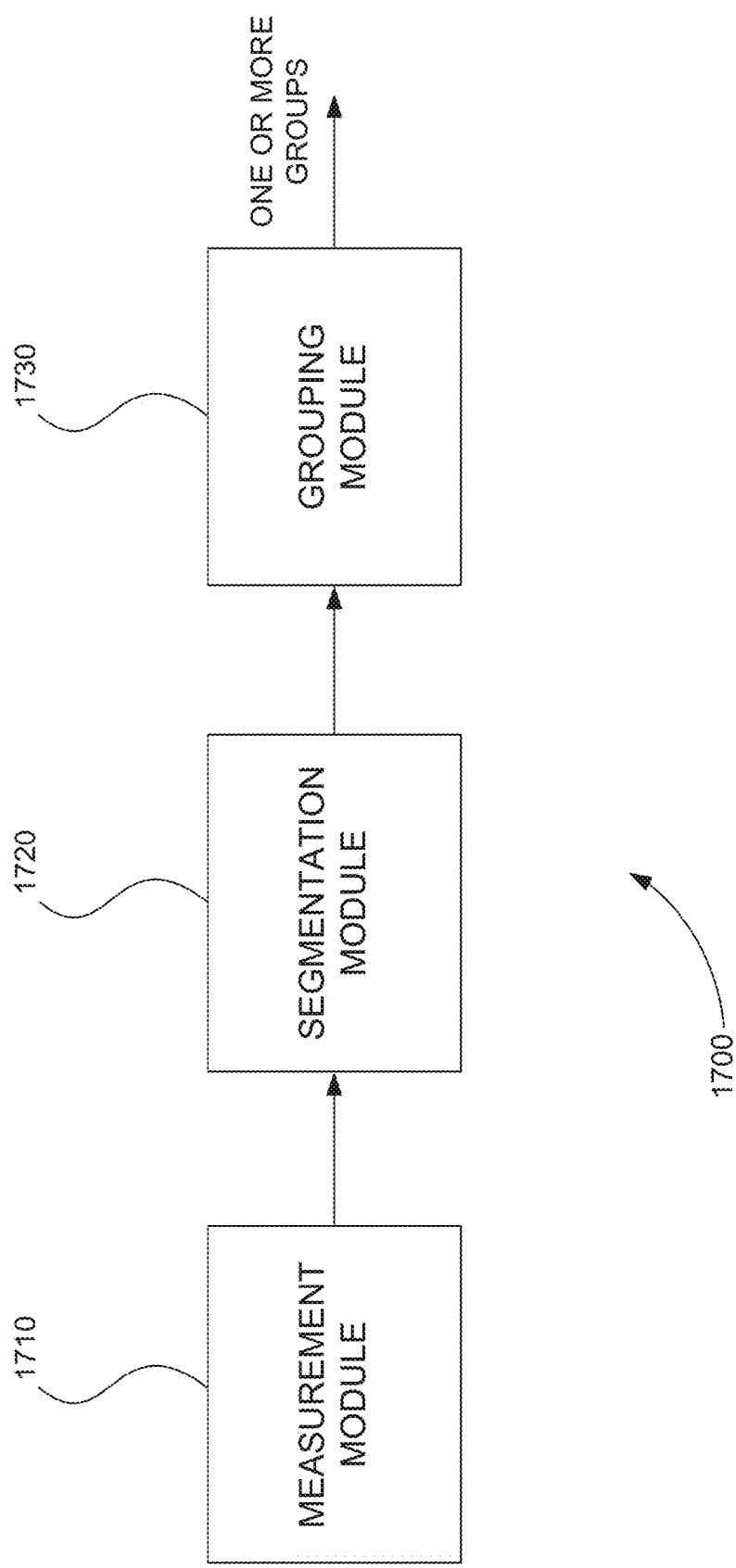
FIG. 17 is a schematic diagram of a system of distinct software modules that performs a method for identifying groups of correlated representations of variables from a large amount of spectrometry data, in accordance with the present teachings.

FIG. 17 is a schematic diagram of a system 1700 of distinct software modules that performs a method for identifying groups of correlated representations of variables from a large amount of spectrometry data, in accordance with the present teachings. System 1700 includes measurement module 1710, segmentation module 1720, and grouping module 1730.

Measurement module 1710 obtains a plurality of variables from a plurality of samples produced by a spectrometric measurement technique. The spectrometric measurement technique can include, but is not limited to, mass spectrometry (MS), liquid chromatography coupled mass spectrometry (LC-MS), or imaging mass spectrometry. Segmentation module 1720 divides the plurality of measured variables into a plurality of measured variable subsets.

Grouping module 1730 performs a number of steps.

(1) Grouping module 1730 performs PCVG on each measured variable subset using the grouping module, producing one or more group representations for each measured variable subset and a plurality of group representations for the plurality of measured variable subsets (2) Grouping module 1730 calculates a total number of the plurality of group representations as a sum of a number of the one or more group representations produced for each measured variable subset.

(3) If the total number is less than or equal to a maximum number of variables allowed for PCVG, grouping module 1730 jumps to step (9).

(4) Grouping module 1730 divides the plurality of group representations into a plurality of group representation subsets.

(5) Grouping module 1730 performs PCVG on each group representation subset, producing one or more group representations for each group representation subset and a plurality of group representations for the plurality of group representation subsets.

(6) Grouping module 1730 calculates the total number of the plurality of group representations as a sum of a number of the one or more group representations produced for each group representation subset.

(7) If the total number is less than or equal to the maximum number, grouping module 1730 jumps to step (9).

(8) If the total number is greater than the maximum number of variables, grouping module 1730 steps (4)-(8).

(9) Grouping module 1730 performs principal component analysis followed by variable grouping on the plurality of group representations, producing a plurality of groups of correlated representations of variables.

Aspects of the present teachings may be further understood in light of the following examples, which should not be construed as limiting the scope of the present teachings in any way.

Software Example

Figure 6:
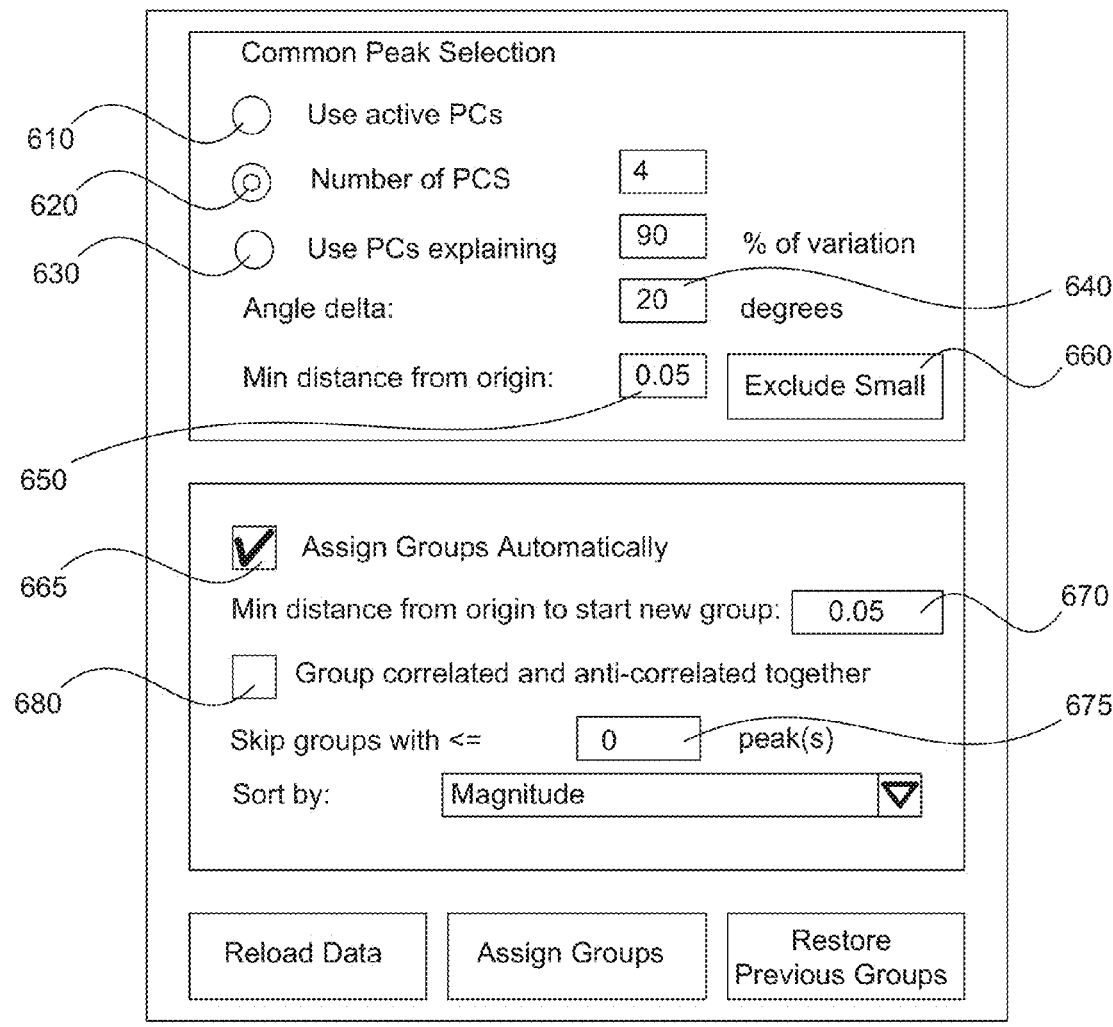
FIG. 6 is an exemplary image of a user interface for a software tool to perform variable grouping, in accordance with the present teachings.

FIG. 6 is an exemplary image of a user interface 600 for a software tool to perform variable grouping, in accordance with the present teachings. User interface 600 and the software tool can be used with existing viewing programs. One existing viewing program is, for example, MARKER-VIEW™ from Applied Biosystems/MDS Sciex.

The software tool can be run while an existing viewing program is running and after some data has been processed to generate scores and loadings plots. On starting, the software tool can interrogate the viewing program and obtain the loadings data. Following processing, the software tool can set a "group" column in the viewing program's loadings table so that the data points can be assigned symbols.

The number of PCs can be selected in three ways. First the number of PCs can be based on those currently displayed in the loadings plot by choosing selection 610. Second, a specific number of PCs can be entered using selection 620. Third, the software tool can select a number of PCs that explains a given amount of variance using selection 630. Selecting a number of PCs that represents a given amount of variance allows some control of the amount of noise ignored.

In field 640 of user interface 600, a user can enter a spatial angle parameter. In field 650, a user can enter a minimum intensity or minimum distance from the origin parameter. If desired, using "exclude small" button 660 on user interface 600, variables less than the minimum distance from the origin parameter can be marked as excluded so that they will not be used in any subsequent analysis.

Automatic or manual grouping can be selected using selection 665 from user interface 600. In the manual case, a user can select a variable of interest in the loadings plots and the software tool extracts a single group using that variable as the starting point. Selecting automatic processing, using selection 665 on user interface 600, allows a user to enter an additional threshold in field 670 for starting a group, which means that small variables can be considered if they are assigned to a group containing a larger variable, but small variables cannot be used to start a new group. User interface 600 can also include field 675 that requires a group to contain a minimum number of variables. Field 675 can be used if the data is expected to contain a number of correlated variables.

As described previously, correlated variables will lie substantially on the same straight line and will be on the same side of the origin of the loadings plot. The software tool can optionally include in the same group variables that are close to the extension of the line on the opposite side of the origin. These variables are anti-correlated. Inclusion of correlated and anti-correlated groups can be selected using selection 680 from user interface 600.

Finally, using selection 685 of user interface 600, a user can select to have the assigned groups sorted based on the intensity of the starting variable or based on the closeness in m-dimensional space to the first variable, for example.

Although user interface 600 shows three ways (i.e., selections 610, 620, and 630) of selecting the number of PCs, a software tool can use any known algorithm to determine how many are significant. In fact, the approach described in the present teachings can be used to iteratively determine the number of PCs to use and the groups. Typically increasing the number of PCs has little effect until the PCs are mostly due to noise, which can cause the number of groups to jump dramatically. As a result, the number of PCs used can be limited to a value less than the value causing the jump in the number of groups.

Data Examples

In various embodiments of the present teachings, methods are described for analyzing PC loadings to determine related variables. For example, those showing similar expression patterns from a series of samples. These methods are illustrated using mass spectrometry (MS) data. However, these methods are applicable to other applications.

The data can be generated by analyzing each sample using a variety of spectrometric techniques, such as nuclear magnetic resonance (NMR), infra-red spectrometry (IR), near infra-red spectrometry (NIR), ultra-violet spectrometry (UV), Raman spectrometry, or mass spectrometry (MS). Analyses may also be performed using hyphenated techniques that couple one of the above spectrometric techniques with a chromatographic separation, such as liquid chromatography (LC), gas chromatography (GC), or capillary electrophoresis (CE). An exemplary hyphenated technique is liquid chromatography mass spectrometry (LC-MS). The patterns may be due to real biological variation that is of interest, such as changes due to disease or treatment with a therapeutic, or may be artifacts of the analysis that can be ignored. The variables found to be related can be interpreted to determine the compounds causing the pattern.

Another exemplary application for these methods can be finding peaks in data from a hyphenated technique. The data is generated using an exemplary hyphenated technique listed above by collecting a series of spectra from the effluent of a separation process. The patterns are due to the intensity profiles observed as peaks elute from the separation. Related variables will have the same pattern of variation and overlapping (unresolved) peaks can be determined. The variables found to be related can be interpreted to determine the compounds causing the pattern.

Another exemplary application for these methods can be interpreting tissue image data. The data is generated by any techniques that can give multiple measurements, such as a spectrum, at various points across a sample of biological tissue. The patterns are due to variations in the amount of compounds at different parts of the tissue and may correspond to different features or structures, such as organs and organelles. The variables found to be related can be interpreted to determine the compounds causing the pattern.

For MS data, the variables in the columns of the Input Matrix are generally mass bins or centroid values, for liquid chromatography coupled mass spectrometry (LC-MS) the variables are characterized by mass-to-charge ratios (m/z) and retention time. In both cases, the data is aligned to ensure that the variable refers to the same signal in all samples.

Figure 7:
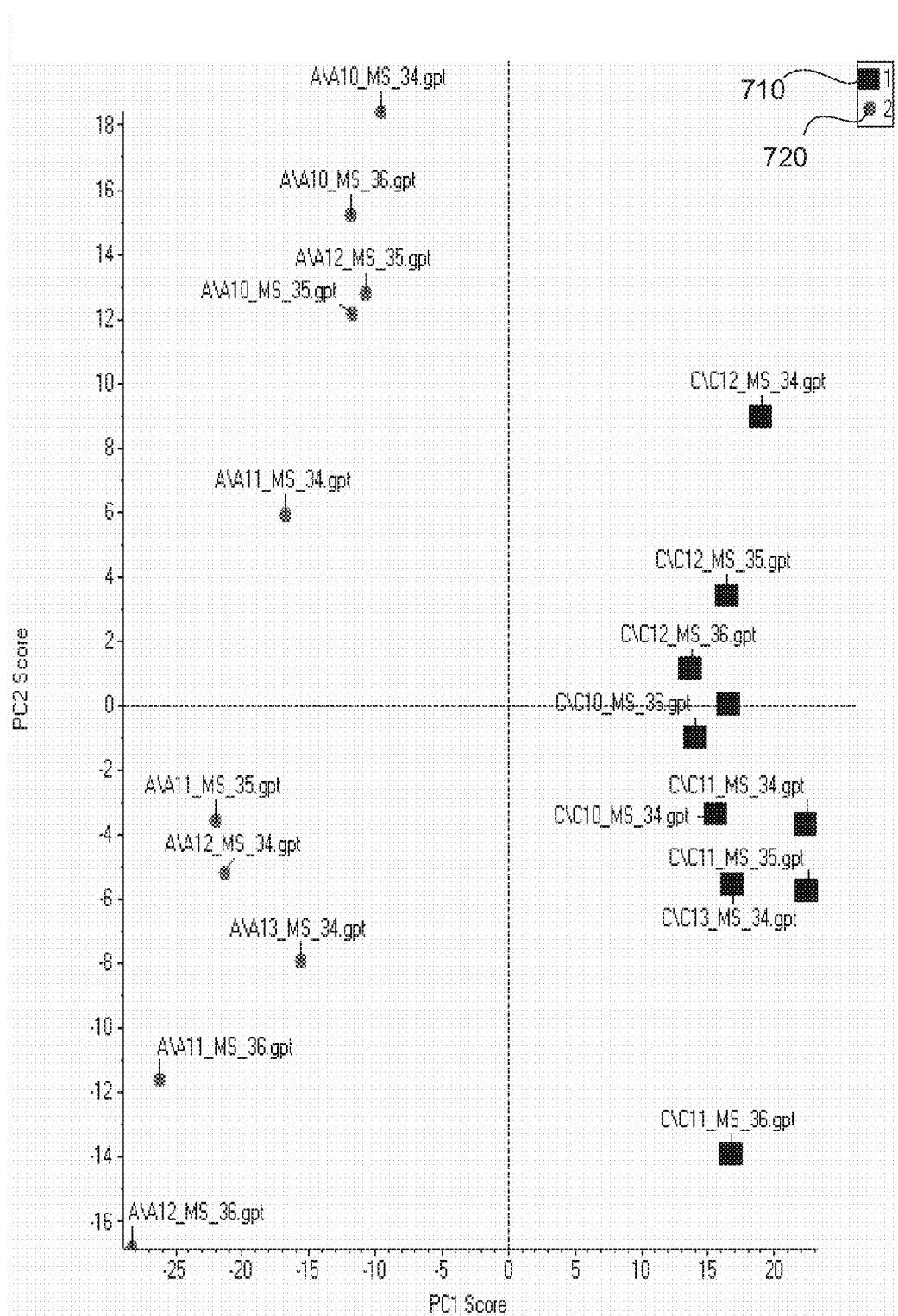
FIG. 7 is an exemplary scores plot of two principal components (PCs) for MS spectra data obtained after Pareto scaling and PCA, in accordance with the present teachings.

FIG. 7 is an exemplary scores plot 700 of two PCs for MS spectra data obtained after Pareto scaling and PCA, in accordance with the present teachings. The MS spectra data shown in FIGS. 7-9 was obtained using matrix-assisted laser desorption/ionization (MALDI). MALDI MS spectra data can be obtained, for example, using a mass spectrometer such as the APPLIED BIOSYSTEMS/MDS SCIEX TOF/TOF™ time of flight/time of flight mass spectrometer. PCA analysis and visualization of MALDI MS spectra data can be performed, for example, using MARKERVIEW™ software from Applied Biosystems/MDS Sciex.

FIG. 7 shows scores for samples from a protein digest with and without a spike of calibration mixture. Scores with a spike of a calibration mixture are shown with symbol 710 in FIG. 7. Scores without a spike of a calibration mixture are shown with symbol 720 in FIG. 7. Labels shown in FIG. 7 with symbols 710 and 720 are a combination of sample and sample group names.

As shown in FIG. 7, the spiked 710 samples and unspiked 720 samples are cleanly separated by the first PC, PC1, which explains the largest amount of variance. The spiked 710 samples have larger PC1 scores, indicating that they have relatively more of the variables with large, positive loadings, as shown in FIG. 8, than the unspiked 720 samples.

Figure 8:
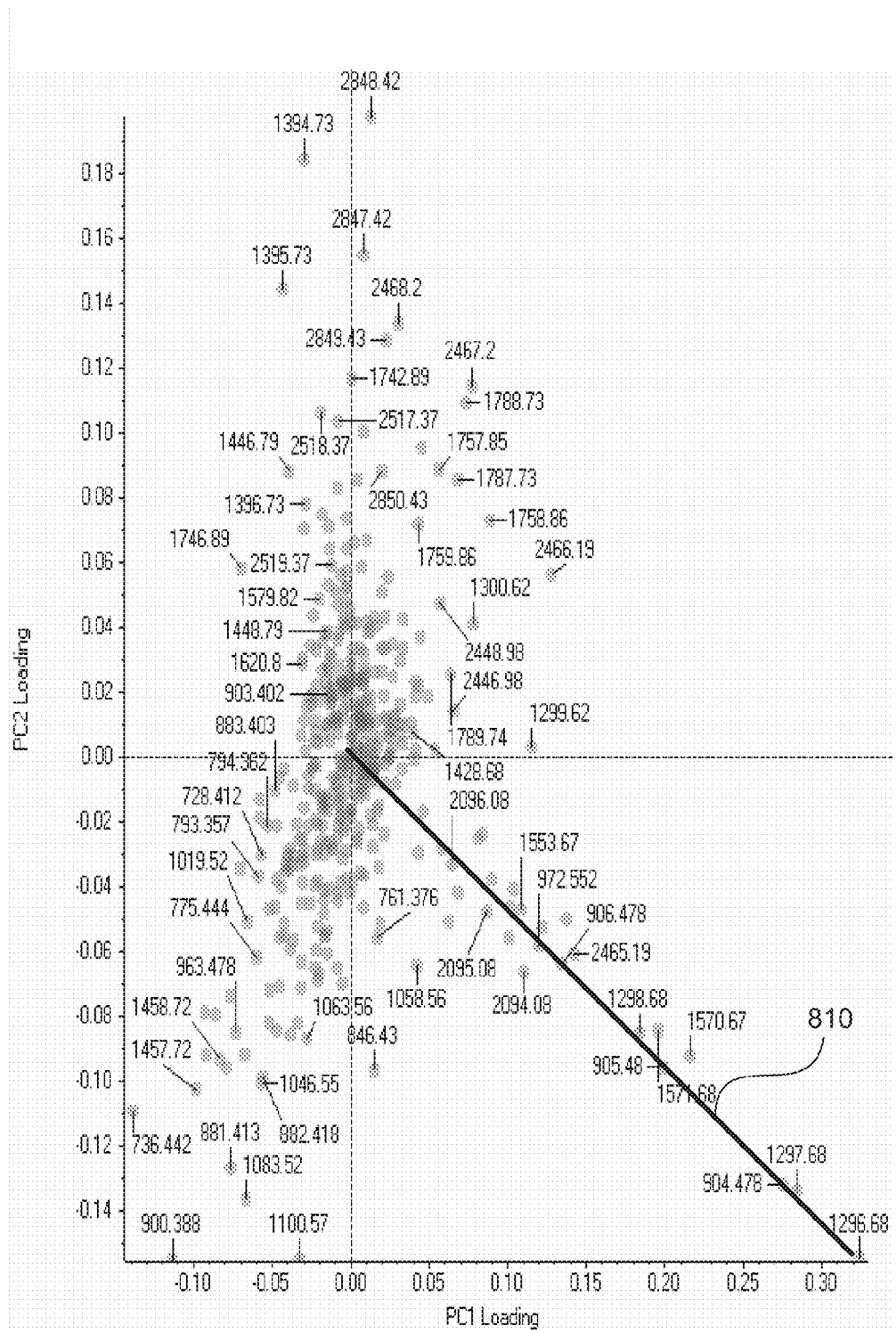
FIG. 8 is an exemplary loadings plot of two PCs for MS spectra data obtained after Pareto scaling and PCA, in accordance with the present teachings.

FIG. 8 is an exemplary loadings plot 800 of two PCs for MS spectra data obtained after Pareto scaling and PCA, in accordance with the present teachings. The labels in plot 800 correspond to the centroid m/z value of the variable.

In the example shown in FIG. 8, variables with the largest PC1 loadings tend to lie on straight line 810 that passes through the origin of the plot. This feature arises because these variables are correlated and show the same behavior across the sample set.

FIG. 8 also shows one benefit of Pareto scaling in interpreting the loadings plot. For any particular isotope cluster, the distance from the origin reflects the relative intensity of the peak. Thus it can be determined if the members of an isotope cluster have the same behavior as expected, which increases confidence in the observed separation/correlation.

Figure 9:
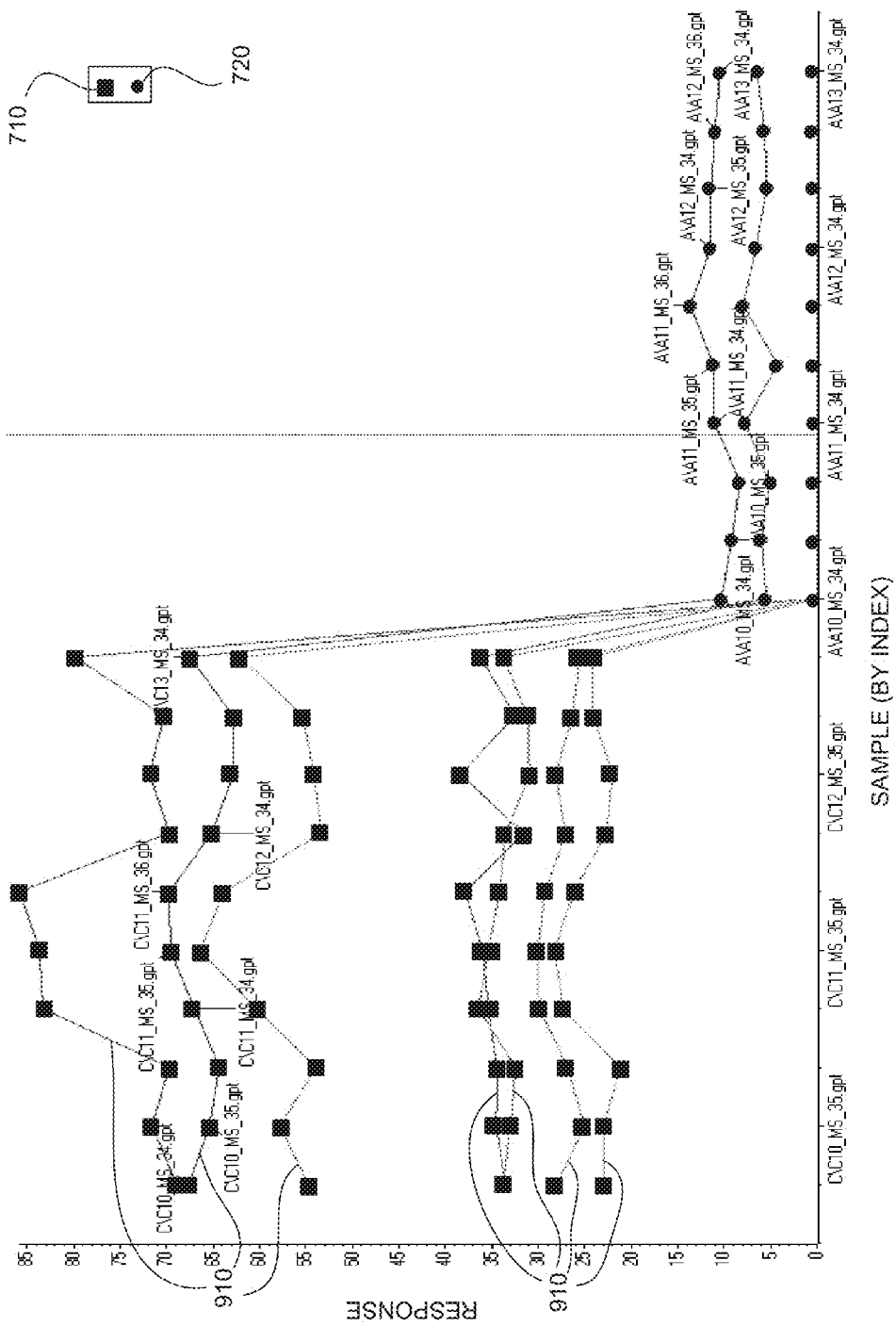
FIG. 9 is an exemplary profile plot of a few representative variables from MS spectra data obtained after Pareto scaling and PCA, in accordance with the present teachings.

FIG. 9 is an exemplary profile plot 900 of a few representative variables 910 from MS spectra data obtained after Pareto scaling and PCA, in accordance with the present teachings. A profile plot is a plot of the response of one or more variables as a function of a plurality of samples. Note that the correlation for variables 910 in FIG. 9 is not perfect due to noise. The slight variation in profiles causes the scatter around correlation line 810 shown in FIG. 8.

In various embodiments, components of a peak can be determined using a multivariate analysis technique on the data from a collection of spectra. If the peak contains data points that have different behaviors across the collection of spectra, the peak is determined to be a convolved peak.

Figure 10:
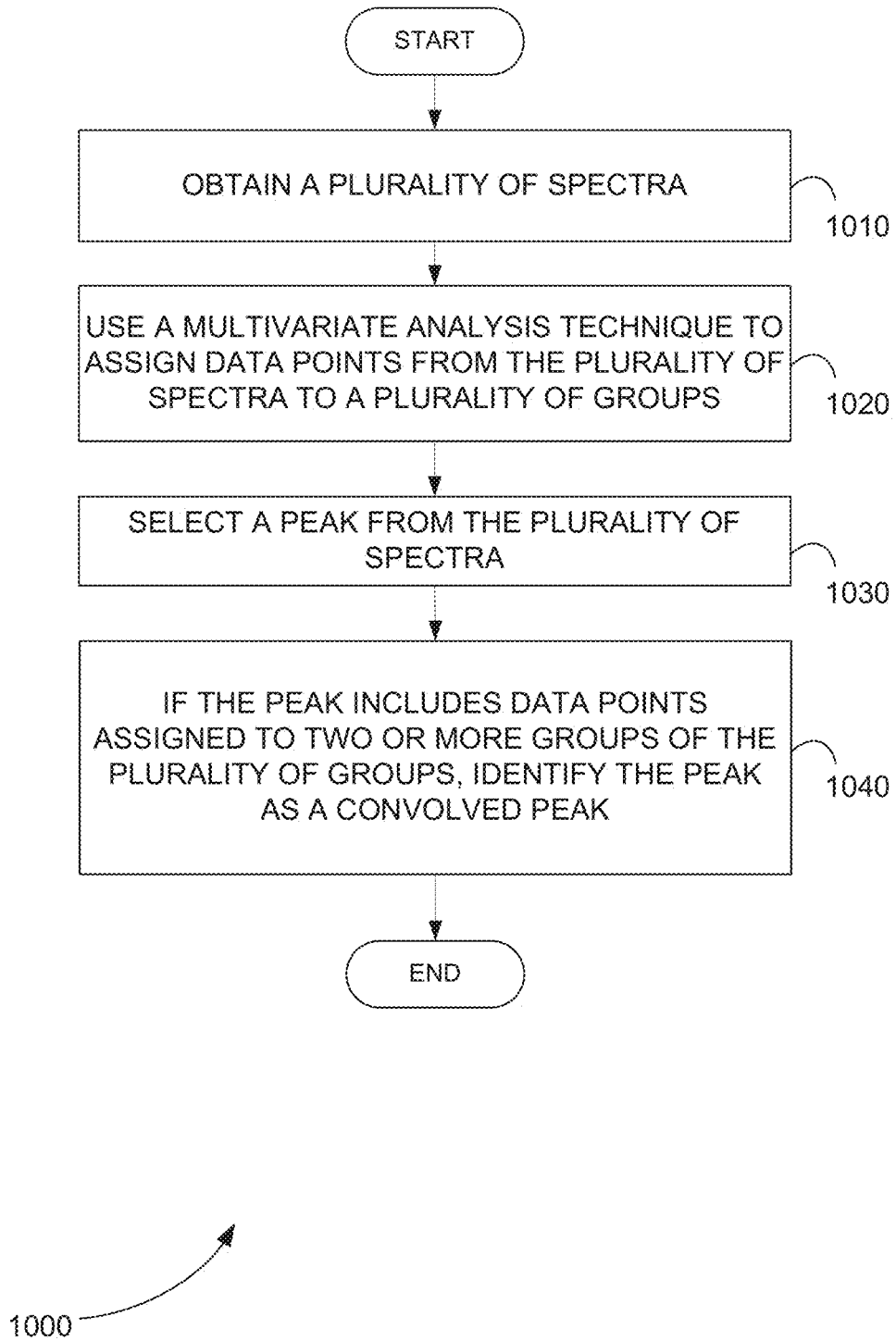
FIG. 10 is a flowchart showing a method for identifying a convolved peak, in accordance with the present teachings.

FIG. 10 is a flowchart showing a method 1000 for identifying a convolved peak, in accordance with the present teachings.

In step 1010 of method 1000, a plurality of spectra is obtained. The plurality of spectra is obtained from multiple samples, for example. In various embodiments, the plurality of spectra is obtained from a single sample. In various embodiments, obtaining the plurality of spectra can include, but is not limited to, performing spectroscopy, mass spectrometry, or nuclear magnetic resonance spectrometry.

In step 1020, a multivariate analysis technique is used to assign data points from the plurality of spectra to a plurality of groups.

In step 1030, a peak is selected from the plurality of spectra.

In step 1040, if the peak includes data points assigned to two or more groups of the plurality of groups, the peak is identified as a convolved peak.

In various embodiments of method 1000, the multivariate analysis technique can include an unsupervised clustering algorithm. An unsupervised clustering algorithm can include, but is not limited to, a self-organizing map, a k-means clustering algorithm, or a hierarchical clustering algorithm.

An unsupervised clustering algorithm can also include performing principal component analysis on the data points and using a method for identifying correlated data points after the principal component analysis to assign the data points to the plurality of groups. A number of principal components produced by the principal component analysis can be selected. A subset principal component space having the number of principal components can be created. A data point in the subset principal component space can be selected. A vector can be extended from an origin of the subset principal component space to the data point. One or more data points in the subset principal component space and within a spatial angle around the vector can be identified as a group of correlated data points. The group of correlated data points can then be assigned to the plurality of groups.

In various embodiments, method 1000 can also include processing one or more groups of the two or more groups of the plurality of groups to obtain information about a component of the peak. This information can include, but is not limited to, intensity data, mass data, chemical shift data, or wavelength data.

In various embodiments, method 1000 can be used with any spectroscopic technique and sample collection method.

In various embodiments, method 1000 can also include obtaining the plurality of spectra from analysis techniques including, but not limited to, liquid chromatography mass spectrometry analysis, gas chromatography mass spectrometry analysis, capillary electrophoresis mass spectrometry analysis, super-critical fluid chromatography mass spectrometry analysis, ion mobility mass spectrometry analysis, field asymmetric ion mobility mass spectrometry analysis, liquid chromatography nuclear magnetic resonance analysis, liquid chromatography ultraviolet spectroscopic analysis, gas chromatography infrared spectroscopic analysis, or spatial analysis.

In various embodiments, related data points can be determined by analyzing a number of samples. The related data points can be determined if they are correlated across the number of samples. For example, if the data points are part of a profile spectrum, a spectral peak may be found that appears to be a singlet, but actually has components that behave differently.

The samples may be a series of single spectra from a collection of real, physical samples. The spectra may be measured directly or obtained by combining all the spectra from the LCMS analyses of individual samples. The samples may be a series of spectra from the same sample, for example, spectra obtained across an LCMS peak. It is important that there is some variation of the ratio of the components of the convolved peaks among the spectra, but the exact form does not have to be known.

Figure 11:
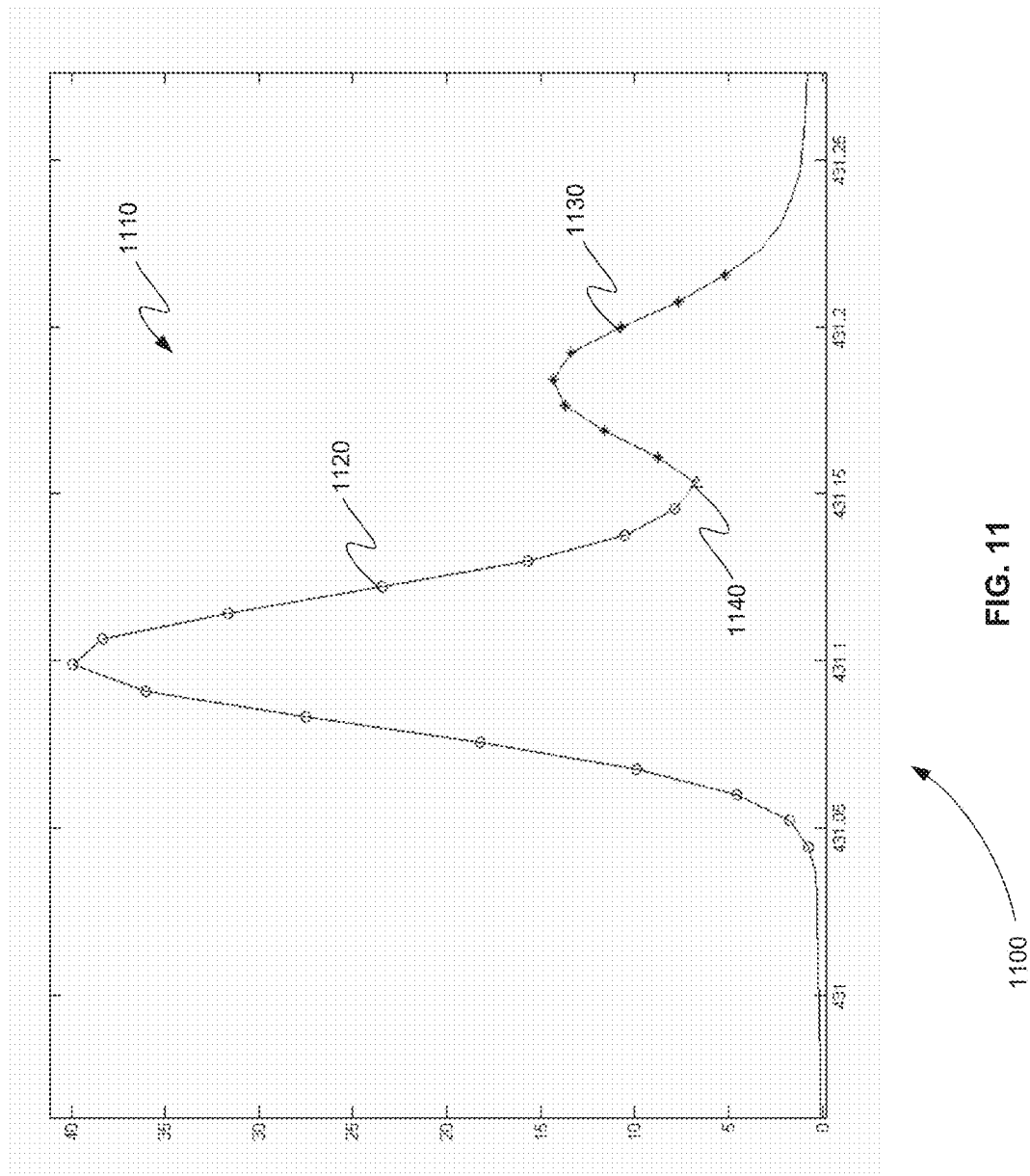
FIG. 11 is an exemplary plot of a convolved peak from a spectrum, in accordance with the present teachings.

FIG. 11 is an exemplary plot 1100 of a convolved peak 1110 from a spectrum, in accordance with the present teachings. The different symbols 1120, 1130, and 1140 correspond to data points of different groups assigned using a method for grouping variables after principal component analysis. The spectrum was obtained from a single sample, but the groups were determined by using the spectra from a number of samples to reveal different parts of each peak that have correlated behaviors.

Figure 12:
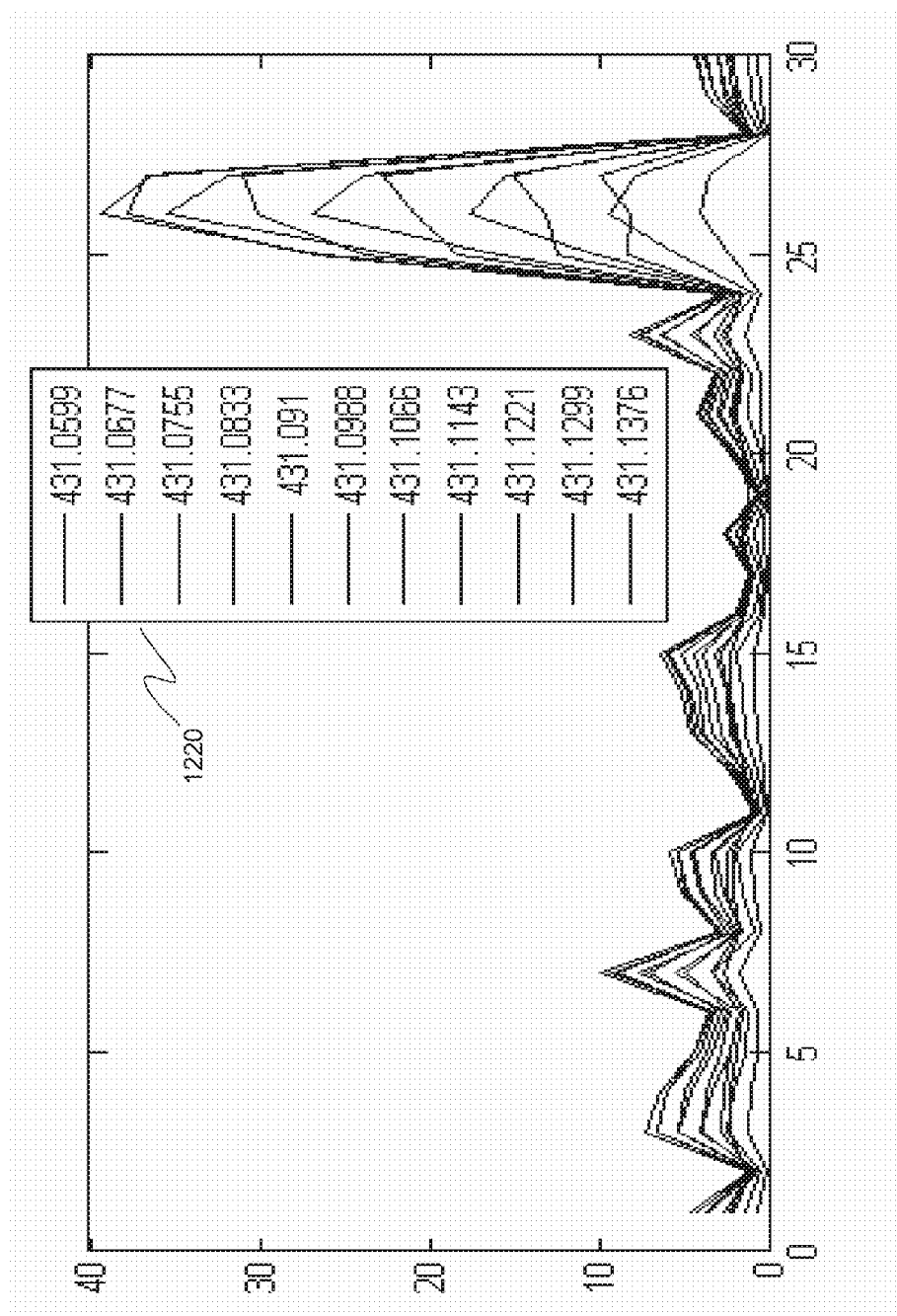
FIG. 12 is an exemplary plot of how intensity for each mass of a first group varies across samples, in accordance with the present teachings.

FIG. 12 is an exemplary plot 1200 of how intensity for each mass of a first group 1220 varies across samples, in accordance with the present teachings. The first group 1220 corresponds to symbols 1120 shown in FIG. 11.

Figure 13:
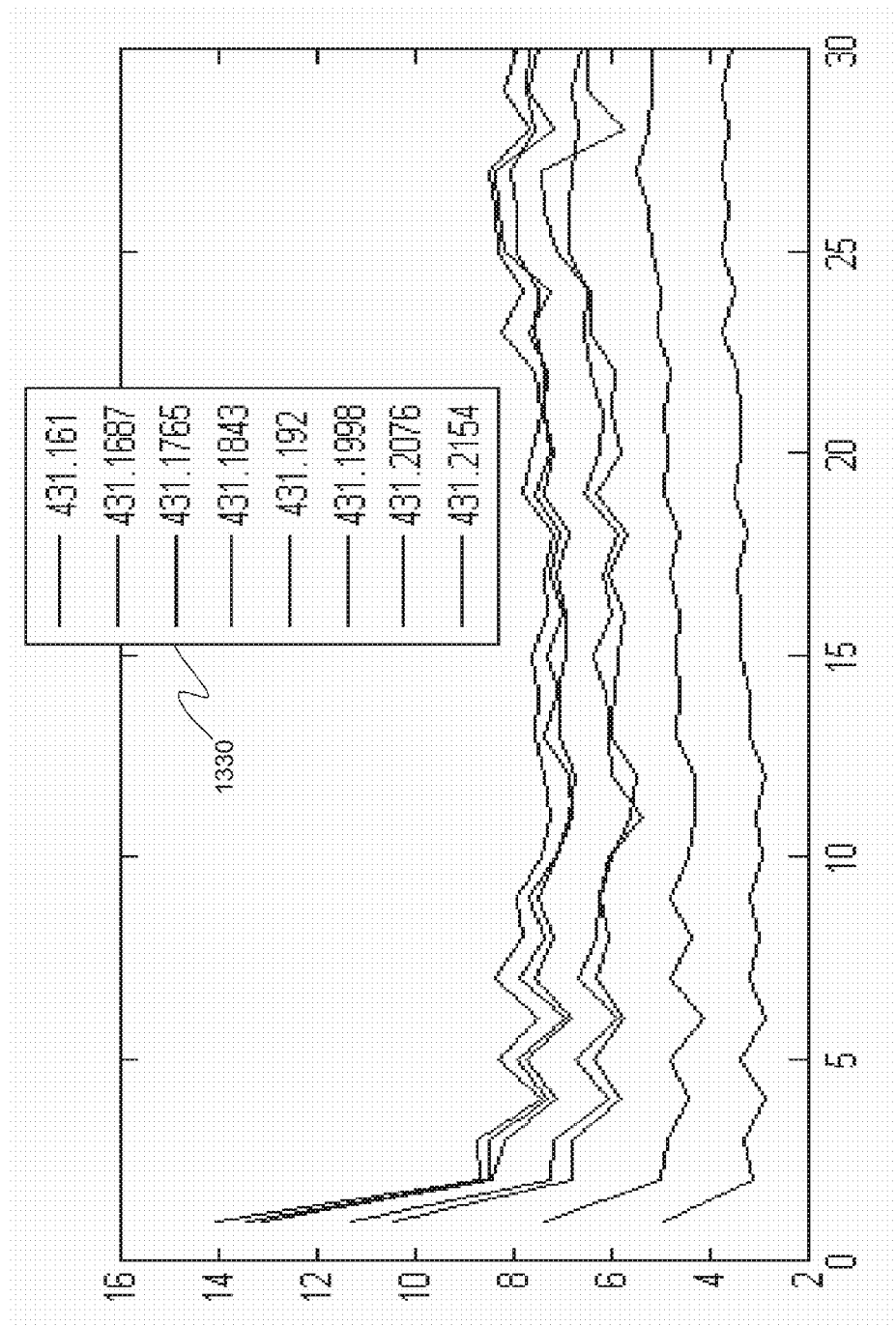
FIG. 13 is an exemplary plot of how intensity for each mass of a second group varies across samples, in accordance with the present teachings.

FIG. 13 is an exemplary plot 1300 of how intensity for each mass of a second group 1330 varies across samples, in accordance with the present teachings. The second group 1330 corresponds to symbols 1130 shown in FIG. 11.

Figure 14:
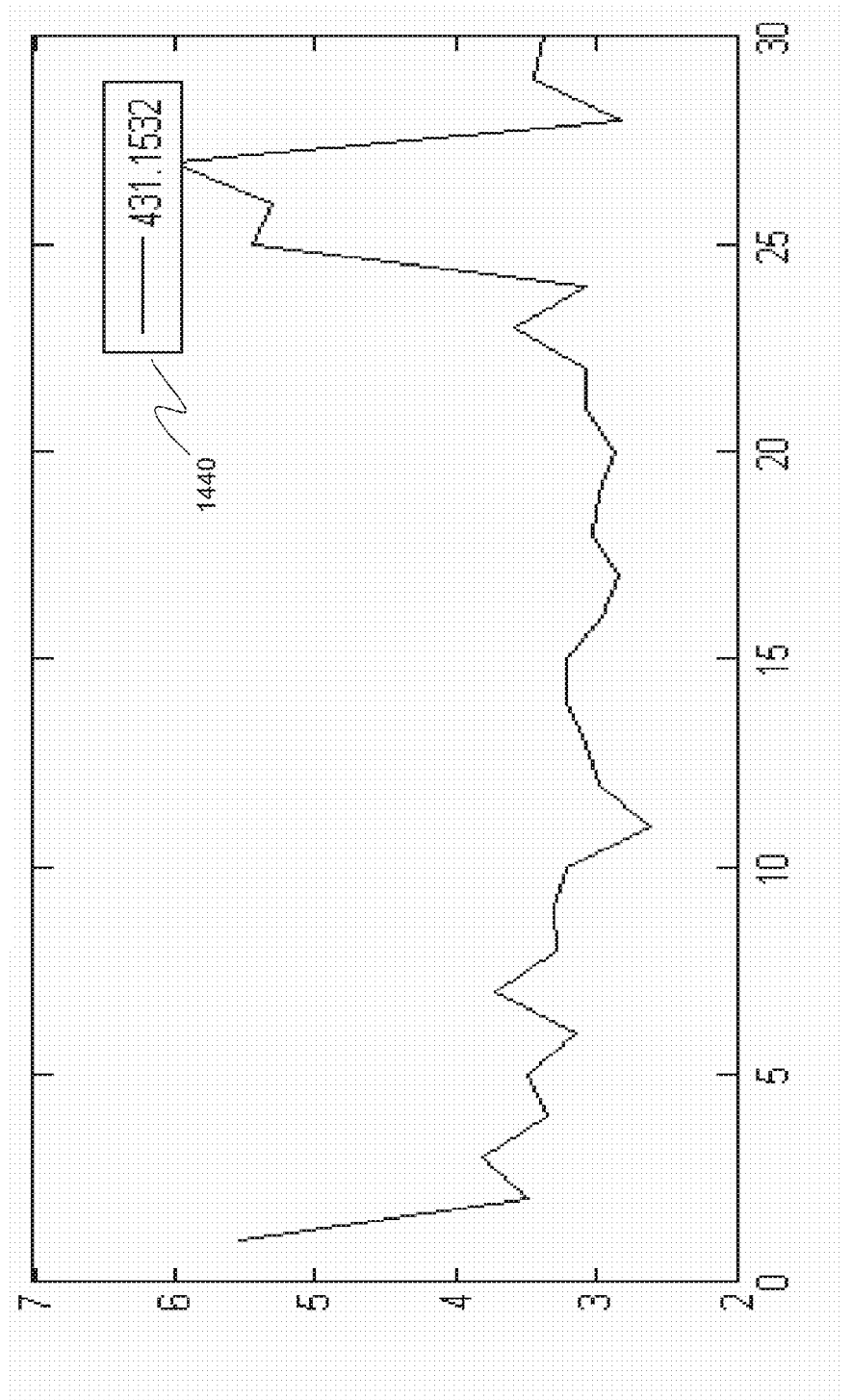
FIG. 14 is an exemplary plot of how intensity for each mass of a third group varies across samples, in accordance with the present teachings.

FIG. 14 is an exemplary plot 1400 of how intensity for each mass of a third group 1440 varies across samples, in accordance with the present teachings. The third group 1440 corresponds to symbol 1140 shown in FIG. 11.

A profile plot shows the response of a data point across samples. Plot 1200 in FIG. 12, plot 1300 in FIG. 13, and plot 1400 in FIG. 14 are profile plots of data points corresponding to symbols 1120, 1130, and 1140 in FIG. 11, respectively. Plot 1200 in FIG. 12 corresponding to symbols 1120 in FIG. 11 depicts a profile that is different from plot 1300 in FIG. 13 corresponding to symbols 1130 in FIG. 11. Data points represented by symbols 1120 and 1130 in FIG. 11 are present in all samples of plot 1200 in FIG. 12 and plot 1300 in FIG. 13, respectively, but show more intense values in particular samples. This indicates that they in fact belong to separate compounds.

The data point represented by symbol 1140 in FIG. 11 and plotted across samples in plot 1400 of FIG. 14 shows that this data point is likely present in the compound corresponding to the data points represented by symbol 1120 in FIG. 11 and the compound corresponding to the data points represented by symbol 1130 in FIG. 11, since plot 1400 of FIG. 14 represents a sum of plot 1200 of FIG. 12 and plot 1300 of FIG. 13. Hence the third group 1430 of FIG. 14 is a separate group but does not indicate the presence of an additional compound. Thus the groups associated with the same peak must be processed to determine the actual number of compounds present.

Processing Fragment Ion Spectra

As described above, fragment ion spectra can support a defined mechanism or propose novel mechanisms of fragmentation and assist in the determination of the structure of a molecule. However, it is typical to threshold fragment ion spectra prior to analysis. As a result, potentially important information is lost.

In various embodiments, by the use of a collision energy (CE) ramp, either performed intra or inter scan, decomposition profiles for the compound, or molecule, can be generated. This data is then treated such that principal component analysis (PCA) analysis can be performed followed by principal component variable grouping (PCVG). PCA-PCVG analysis provides insight into the ions that are being created and fragmented with respect to CE. By mapping these fragments it is possible to formulate a series of groups of ions which could be associated with each other (i.e. ions which show a CE maxima of 35 ev would be generated after a group of ions which show a maximum at 25 ev).

The ions in the different groups are not limited to the major ions. In various embodiments, a minor ion can also be accounted for by comparing its fragmentation profile to that of the other group members. It is possible that the minor ions could then be linked to formulae dependent upon the order by which they are generated. Grouping based on CE can then also be sub grouped based on their mass (i.e. a fragment of 405 m/z with a CE maxima of 35 ev could not be generated from a fragment with a m/z less than 405 in a group with a CE maxima less than 35 ev). Such grouping allows a cluster model to be defined from the formation of the fragments based on their mass and also their CE maxima.

By determining the peak shape and also the peak intensity another level of information can be determined. The peak shape across the CE ramp is indicative of the rate of formation and decay. If there is more than one possible route to forming the mass, then the peak width will be different from other peaks. This can be used to show a difference in the fragmentation pathways. Besides the peak shape the intensity of the peak can also be used to perform a series of mass balance measurements on the suspected related fragment ions.

Systems and Methods of Data Processing

Mass Spectrometry System

Figure 18:
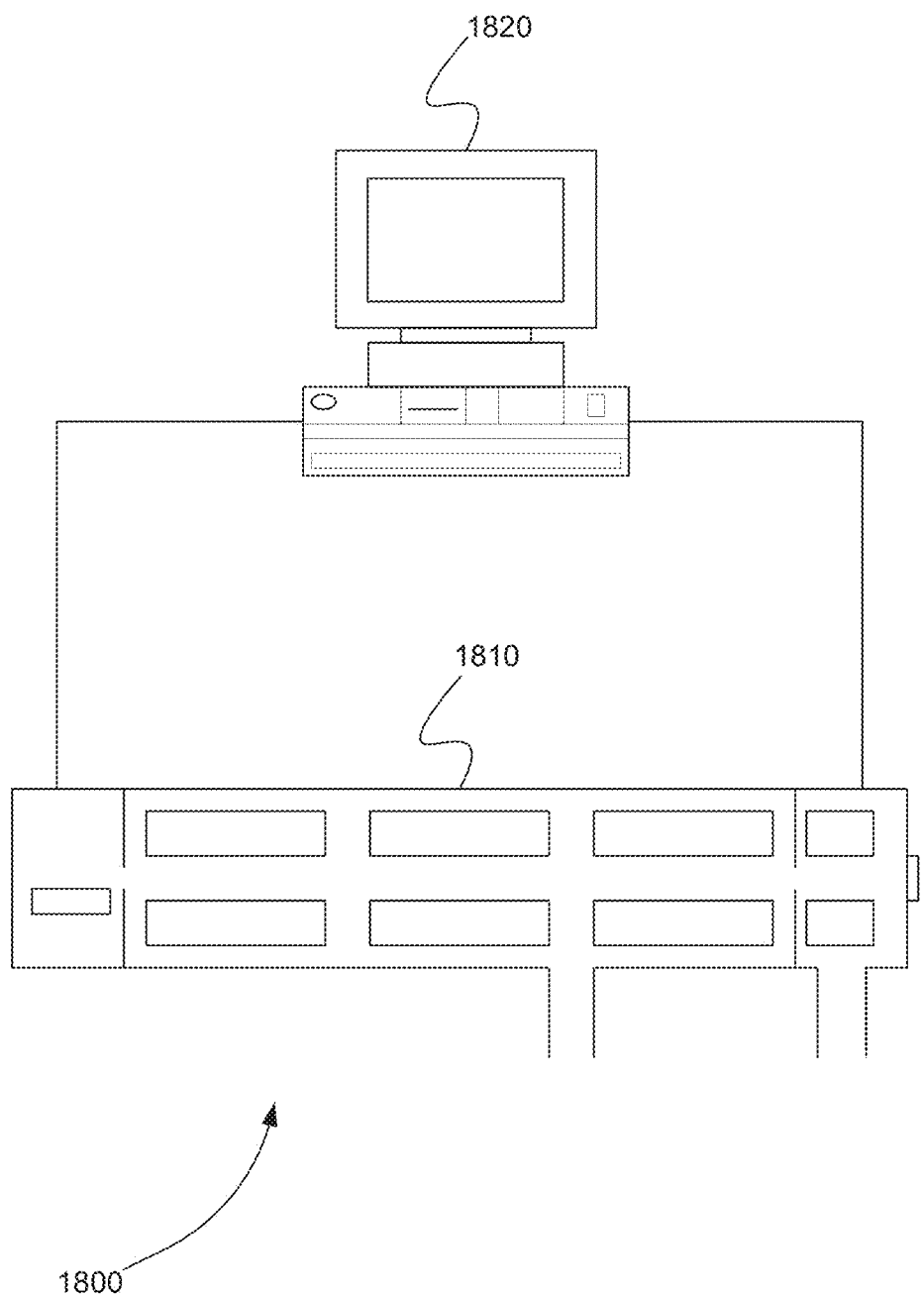
FIG. 18 is a schematic diagram showing a system for grouping fragment ions of a molecule using tandem mass spectrometry with ramps in collision energy, in accordance with various embodiments.

FIG. 18 is a schematic diagram showing a system 1800 for grouping fragment ions of a molecule using tandem mass spectrometry with ramps in collision energy, in accordance with various embodiments. System 1800 mass spectrometer 1810 and processor 1820.

Mass spectrometer 1810 is a tandem mass spectrometer, for example. Mass spectrometer 1810 can include one or more physical mass analyzers that perform two or more mass analyses. A mass analyzer of a tandem mass spectrometer can include, but is not limited to, a time-of-flight (TOF), quadrupole, an ion trap, a linear ion trap, an orbitrap, a magnetic four-sector mass analyzer, a hybrid quadrupole time-of-flight (Q-TOF) mass analyzer, or a Fourier transform mass analyzer. Mass spectrometer 1810 can include separate mass spectrometry stages or steps in space or time, respectively.

Mass spectrometer 1810 fragments and analyzes a known molecule using a plurality of different collision energies. Mass spectrometer 1810 produces a plurality of variables for the plurality of fragment ions.

Processor 1820 is in communication with mass spectrometer 1810. Processor 1820 can also be in communication with separation device 1810. Processor 1820 can be, but is not limited to, a computer, microprocessor, or any device capable of sending and receiving control signals and data to and from mass spectrometer 1810 and processing data.

Processor 1820 obtains the plurality of variables from mass spectrometer 1810. Processor 1820 can obtain the plurality of variables in real time or read the plurality of variables from a file stored in memory, for example. Processor 1820 performs principal component analysis on the plurality of variables. Processor 1820 selects a number of principal components produced by the principal component analysis. Processor 1820 creates a subset principal component space having the number of principal components. Processor 1820 selects a variable in the subset principal component space. Processor 1820 defines a spatial angle around a vector extending from the origin to the variable. Processor 1820 selects a set of one or more variables within the spatial angle of the vector. Processor 1820 assigns the set to a group, if the set comprises a minimum number of variables. The group identifies correlated variables. The minimum number of variables is the number of correlated variables a group is expected to include, for example.

In various embodiments, processor 1820 creates one or more additional groups. Processor 1820 removes the set of one or more variables in each group from further analysis after the creation of each group. Processor 1820 then repeats the above mentioned steps starting with selecting a variable in the subset principal component space, until remaining variables not assigned to a group do not exceed a threshold. A plurality of groups is created.

In various embodiments, processor 1820 orders the plurality of groups by collision energy.

In various embodiments, processor 1820 maps one or more groups of the plurality of groups to a fragmentation pathway.

In various embodiments, processor 1820 creates a profile plot that includes a fragment ion from each group of the plurality of groups.

In various embodiments, processor 1820 compares peak shapes and/or intensities of the profile plot to map a fragment ion to a fragmentation pathway.

Mass Spectrometry Method

Figure 19:
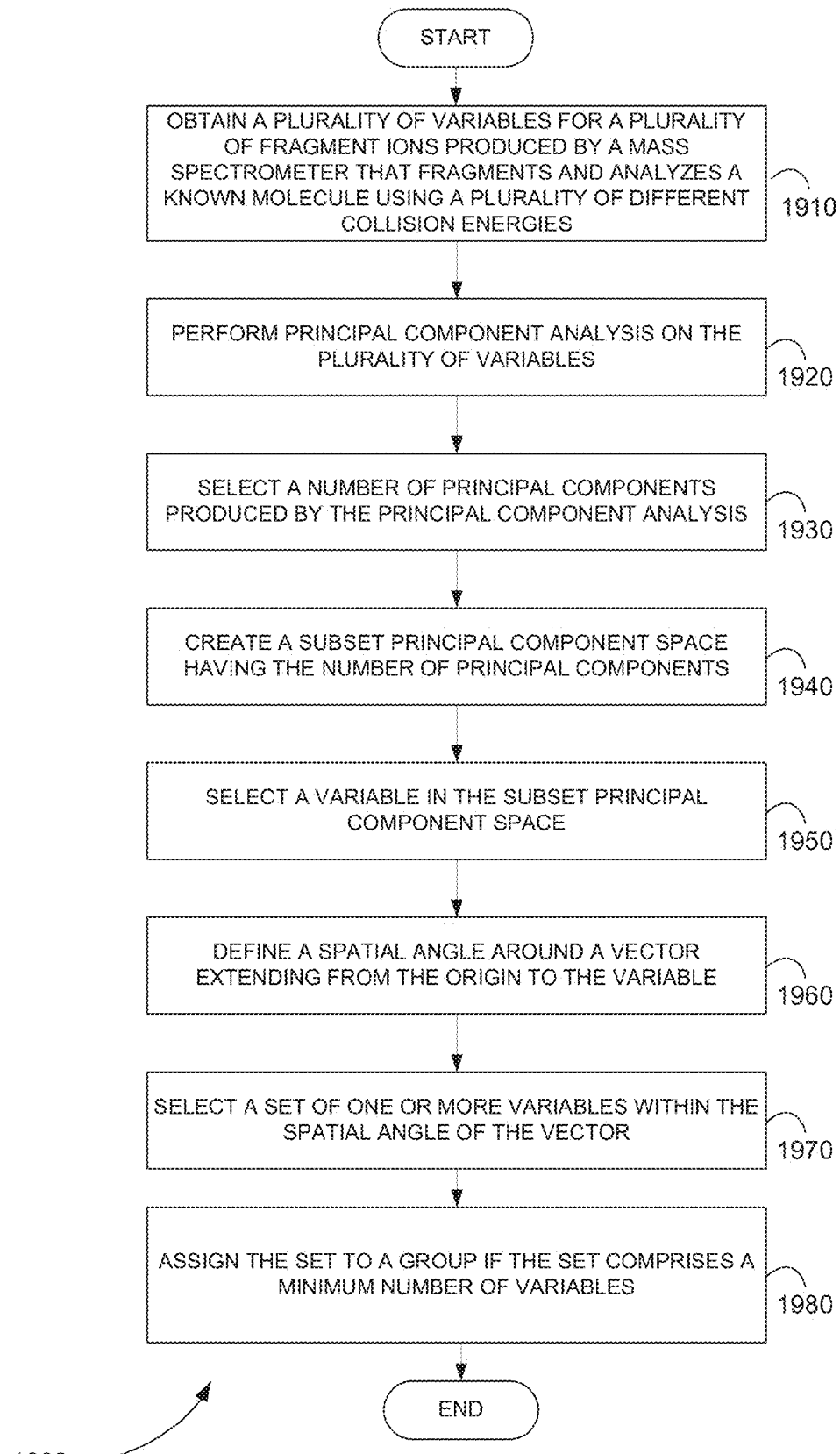
FIG. 19 is an exemplary flowchart showing a method for grouping fragment ions of a molecule using mass spectrometry with ramps in collision energy, in accordance with various embodiments.

FIG. 19 is an exemplary flowchart showing a method 1900 for grouping fragment ions of a molecule using mass spectrometry with ramps in collision energy, in accordance with various embodiments.

In step 1910 of method 1900, a plurality of variables for a plurality of fragment ions produced by a mass spectrometer that fragments and analyzes a known molecule using a plurality of different collision energies are obtained.

In step 1920, principal component analysis is performed on the plurality of variables.

In step 1930, a number of principal components produced by the principal component analysis are selected.

In step 1940, a subset principal component space having the number of principal components is created.

In step 1950, a variable in the subset principal component space is selected.

In step 1960, a spatial angle around a vector extending from the origin to the variable is defined.

In step 1970, a set of one or more variables within the spatial angle of the vector is selected.

In step 1980, the set is assigned to a group, if the set comprises a minimum number of variables. The group identifies correlated variables. The minimum number of variables is the number of correlated variables a group is expected to include.

Mass Spectrometry Computer Program Product

In various embodiments, a computer program product includes a non-transitory and tangible computer-readable storage medium whose contents include a program with instructions being executed on a processor so as to perform a method for grouping fragment ions of a molecule using tandem mass spectrometry with ramps in collision energy. This method is performed by a system that includes one or more distinct software modules.

FIG. 20 is a schematic diagram of a system 2000 that includes one or more distinct software modules that performs a method for grouping fragment ions of a molecule using mass spectrometry with ramps in collision energy, in accordance with various embodiments. System 2000 includes measurement module 2010 and grouping module 2020.

Measurement module 2010 obtains a plurality of variables for a plurality of fragment ions produced by a mass spectrometer. The mass spectrometer fragments and analyzes a known molecule using a plurality of different collision energies.

Grouping module 2020 performs principal component analysis on the plurality of variables. Grouping module 2020 selects a number of principal components produced by the principal component analysis. Grouping module 2020 creates a subset principal component space having the number of principal components. Grouping module 2020 selects a variable in the subset principal component space. Grouping module 2020 defines a spatial angle around a vector extending from an origin to the variable. Grouping module 2020 selects a set of one or more variables within the spatial angle of the vector. Grouping module 2020 assigns the set to a group, if the set comprises a minimum number of variables. The group identifies correlated variables. The minimum number of variables is the number of correlated variables a group is expected to include.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A system for grouping fragment ions of a molecule and determining a fragmentation pathway for the molecule using mass spectrometry with ramps in collision energy, comprising:
  a mass spectrometer that fragments and analyzes a known molecule using a plurality of different collision energies producing a plurality of variables for a plurality of fragment ions, wherein the plurality of variables include intensities for mass-to-charge ratio (m/z) values of the plurality of fragment ions for the plurality of different collision energies; and
  a processor that
    performs principal component analysis on the plurality of variables,
    selects a number of principal components produced by the principal component analysis,
    creates a subset principal component space having the number of principal components,
    (a) selects a variable in the subset principal component space,
    (b) defines a spatial angle around a vector extending from an origin to the variable,
    (c) selects a set of one or more variables within the spatial angle of the vector,
    (d) assigns the set to a group, if the set comprises a minimum number of variables, wherein the group identifies correlated variables and wherein the minimum number of variables is a number of correlated variables a group is expected to include, and
    (e) removes the set of one or more variables from further analysis and repeats steps (a)-(e) until remaining variables not assigned to a group do not exceed a threshold, producing a plurality of groups,
    orders the plurality of groups by collision energy,
    selects the variables for at least one fragment ion from each of two or more of the ordered plurality of groups, and
    compares the selected fragment ions or the variables of the selected fragment ions to determine a fragmentation pathway for the known molecule.

2. The system of claim 1, wherein the processor compares the variables of the selected fragment ions to determine a fragmentation pathway for the known molecule by creating a profile plot that includes the variables of the selected fragment ions plotted as a function of collision energy.

3. The system of claim 2, wherein the processor compares peak shapes of the variables of the selected fragment ions plotted as a function of collision energy in the profile plot to determine the fragmentation pathway.

4. The system of claim 2, wherein the processor compares peak intensities of the variables of the selected fragment ions plotted as a function of collision energy in the profile plot to determine the fragmentation pathway.

5. The system of claim 1, wherein the processor compares the selected fragment ions to determine a fragmentation pathway for the known molecule by comparing the m/z values of the selected fragment ions.

6. A method for grouping fragment ions of a molecule and determining a fragmentation pathway for the molecule using mass spectrometry with ramps in collision energy, comprising:
- obtaining a plurality of variables for a plurality of fragment ions produced by a mass spectrometer that fragments and analyzes a known molecule using a plurality of different collision energies, wherein the plurality of variables include intensities for mass-to-charge ratio (m/z) values of the plurality of fragment ions for the plurality of different collision energies;
- performing principal component analysis on the plurality of variables;
- selecting a number of principal components produced by the principal component analysis;
- creating a subset principal component space having the number of principal components;
- (a) selecting a variable in the subset principal component space;
- (b) defining a spatial angle around a vector extending from an origin to the variable;
- (c) selecting a set of one or more variables within the spatial angle of the vector;
- (d) assigning the set to a group, if the set comprises a minimum number of variables, wherein the group identifies correlated variables and wherein the minimum number of variables is a number of correlated variables a group is expected to include; and
- (e) removing the set of one or more variables from further analysis and repeating steps (a)-(e) until remaining variables not assigned to a group do not exceed a threshold, producing a plurality of groups;
- ordering the plurality of groups by collision energy;
- selecting the variables for at least one fragment ion from each of two or more of the ordered plurality of groups; and
- comparing the selected fragment ions or the variables of the selected fragment ions to determine a fragmentation pathway for the known molecule.

7. The method of claim 6, wherein comparing the selected fragment ions or the variables of the selected fragment ions to determine a fragmentation pathway for the known molecule comprises creating a profile plot that includes the variables of the selected fragment ions plotted as a function of collision energy.

8. The method of claim 7, further comprising comparing peak shapes of the variables of the selected fragment ions plotted as a function of collision energy in the profile plot to determine the fragmentation pathway.

9. The method of claim 7, further comprising comparing peak intensities of the variables of the selected fragment ions plotted as a function of collision energy in the profile plot to determine the fragmentation pathway.

10. The method of claim 6, wherein comparing the selected fragment ions to determine a fragmentation pathway for the known molecule comprises comparing the m/z values of the selected fragment ions.

11. A computer program product, comprising a non-transitory and tangible computer-readable storage medium whose contents include a program with instructions being executed on a processor so as to perform a method for grouping fragment ions of a molecule and determining a fragmentation pathway for the molecule using mass spectrometry with ramps in collision energy, the method comprising:
- providing a system, wherein the system comprises one or more distinct software modules, and wherein the distinct software modules comprise a measurement module and a grouping module;
- obtaining a plurality of variables for a plurality of fragment ions produced by a mass spectrometer that fragments and analyzes a known molecule using a plurality of different collision energies using the measurement module, wherein the plurality of variables include intensities for mass-to-charge ratio (m/z) values of the plurality of fragment ions for the plurality of different collision energies;
- performing principal component analysis on the plurality of variables using the grouping module;
- selecting a number of principal components produced by the principal component analysis using the grouping module;
- creating a subset principal component space having the number of principal components using the grouping module;
- (a) selecting a variable in the subset principal component space using the grouping module;
- (b) defining a spatial angle around a vector extending from an origin to the variable using the grouping module;
- (c) selecting a set of one or more variables within the spatial angle of the vector using the grouping module;
- (d) assigning the set to a group, if the set comprises a minimum number of variables using the grouping module, wherein the group identifies correlated variables and wherein the minimum number of variables is a number of correlated variables a group is expected to include; and
- (e) removing the set of one or more variables from further analysis and repeating steps (a)-(e) until remaining variables not assigned to a group do not exceed a threshold using the grouping module, producing a plurality of groups;
- ordering the plurality of groups by collision energy using the grouping module;
- selecting the variables for at least one fragment ion from each of two or more of the ordered plurality of groups using the grouping module; and
- comparing the selected fragment ions or the variables of the selected fragment ions to determine a fragmentation pathway for the known molecule using the grouping module.

12. The computer program product of claim 11, wherein comparing the selected fragment ions or the variables of the selected fragment ions to determine a fragmentation pathway for the known molecule comprises creating a profile plot that includes the variables of the selected fragment ions plotted as a function of collision energy.

13. The computer program product of claim 12, further comprising comparing peak shapes of the variables of the selected fragment ions plotted as a function of collision energy in the profile plot to determine the fragmentation pathway.

14. The computer program product of claim 12, further comprising comparing peak intensities of the variables of the selected fragment ions plotted as a function of collision energy in the profile plot to determine the fragmentation pathway.

15. The computer program product of claim 11, wherein comparing the selected fragment ions to determine a fragmentation pathway for the known molecule comprises comparing the m/z values of the selected fragment ions.

* * * * *